United States Patent
Rihei

(10) Patent No.: US 11,155,049 B2
(45) Date of Patent: Oct. 26, 2021

(54) COMPOSITE MATERIAL SHAPING DEVICE AND COMPOSITE MATERIAL SHAPING METHOD

(71) Applicant: Fuji Jukogyo Kabushiki Kaisha, Tokyo (JP)

(72) Inventor: Atsushi Rihei, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 369 days.

(21) Appl. No.: 15/387,453

(22) Filed: Dec. 21, 2016

(65) Prior Publication Data

US 2017/0239897 A1    Aug. 24, 2017

(30) Foreign Application Priority Data

Feb. 23, 2016    (JP) .............................. JP2016-031792

(51) Int. Cl.
*B29C 70/50* (2006.01)
*B29C 70/54* (2006.01)
(Continued)

(52) U.S. Cl.
CPC ............ *B29C 70/504* (2013.01); *B29C 70/54* (2013.01); *B29K 2105/0872* (2013.01); *B29L 2031/001* (2013.01)

(58) Field of Classification Search
CPC .................. B29C 70/504; B29C 70/54; B29K 2105/0872; B29L 2031/001
See application file for complete search history.

(56) References Cited

U.S. PATENT DOCUMENTS 2,438,566 A * 3/1948 Long .................... B23Q 1/28
                                                                248/660
3,518,157 A    6/1970 Terry et al.
(Continued)

FOREIGN PATENT DOCUMENTS

CN              204748729      * 11/2015
DE       10 2007 048 792 A1    4/2009
(Continued)

OTHER PUBLICATIONS

United States Office Action dated Aug. 23, 2018 in U.S. Appl. No. 15/042,062.
(Continued)

*Primary Examiner* — Francisco W Tschen
*Assistant Examiner* — Guy F Mongelli
(74) *Attorney, Agent, or Firm* — McGinn I.P Law Group, PLLC.

(57) ABSTRACT

According to one implementation, a composite material shaping device includes three rollers and an angle adjusting structure. The three rollers apply pressures on a laminated body of prepregs, from different directions. The prepregs are laminated in a bar shape. The angle adjusting structure continuously changes an angle of a rotating axis of at least one roller out of the three rollers. Further, according to one implementation, a composite material shaping method includes applying pressures on a laminated body of prepregs laminated in a bar shape, from different directions, using three rollers; and producing a shaped laminated body of the prepregs by continuously changing an angle of a rotating axis of at least one roller out of the three rollers.

17 Claims, 14 Drawing Sheets

(51) Int. Cl.
  *B29K 105/08* (2006.01)
  *B29L 31/00* (2006.01)

(56) References Cited

U.S. PATENT DOCUMENTS

| | | | | |
|---|---|---|---|---|
| 3,931,881 | A | 1/1976 | Bickel | |
| RE31,925 | E | 6/1985 | Jenks | |
| 4,882,007 | A * | 11/1989 | Lengen | B29C 70/545 |
| | | | | 156/523 |
| 4,944,671 | A * | 7/1990 | Vohland | B29B 13/023 |
| | | | | 432/59 |
| 5,277,735 | A | 1/1994 | Schlatter | |
| 5,328,540 | A | 7/1994 | Clayton | |
| 6,701,990 | B1 | 3/2004 | Burley | |
| 8,940,119 | B2 | 1/2015 | Hanawa et al. | |
| 2002/0082099 | A1* | 6/2002 | Chang | A63B 67/02 |
| | | | | 473/157 |
| 2003/0067094 | A1 | 4/2003 | Dempsey | |
| 2005/0028925 | A1* | 2/2005 | Fernandes | B29B 15/122 |
| | | | | 156/269 |
| 2005/0056362 | A1* | 3/2005 | Benson | B29C 70/388 |
| | | | | 156/163 |
| 2005/0153708 | A1* | 7/2005 | Dommert | E02F 3/7613 |
| | | | | 455/456.1 |
| 2005/0160138 | A1* | 7/2005 | Ishidoshiro | H04L 63/06 |
| | | | | 709/203 |
| 2006/0008111 | A1* | 1/2006 | Nagaoka | H04R 7/122 |
| | | | | 381/423 |
| 2007/0113480 | A1* | 5/2007 | Choi | E05F 15/619 |
| | | | | 49/342 |
| 2010/0024966 | A1* | 2/2010 | Felip | B29C 53/265 |
| | | | | 156/196 |
| 2010/0024971 | A1* | 2/2010 | Benson | B29C 70/32 |
| | | | | 156/245 |
| 2010/0028593 | A1* | 2/2010 | Taketa | B29C 43/222 |
| | | | | 428/113 |
| 2010/0136155 | A1 | 6/2010 | Tashiro | |
| 2010/0279076 | A1* | 11/2010 | Kim | B29C 70/46 |
| | | | | 428/174 |
| 2012/0038086 | A1* | 2/2012 | Pini | B29C 33/485 |
| | | | | 264/313 |
| 2012/0213559 | A1* | 8/2012 | Krucinski | B23Q 1/28 |
| | | | | 248/660 |
| 2013/0116070 | A1* | 5/2013 | Xun | B29C 70/865 |
| | | | | 473/561 |
| 2013/0126095 | A1* | 5/2013 | Johns | B29C 70/388 |
| | | | | 156/361 |
| 2013/0142997 | A1* | 6/2013 | Hofmann | E05F 15/619 |
| | | | | 49/342 |
| 2013/0284847 | A1* | 10/2013 | Hou | B65H 18/08 |
| | | | | 242/471 |
| 2014/0061425 | A1* | 3/2014 | Eoh | H04N 5/64 |
| | | | | 248/550 |
| 2014/0090523 | A1* | 4/2014 | Hsieh | H04L 63/06 |
| | | | | 709/203 |
| 2014/0110063 | A1 | 4/2014 | Mathon et al. | |
| 2014/0309365 | A1* | 10/2014 | Beck | B65H 18/08 |
| | | | | 242/471 |
| 2015/0053333 | A1 | 2/2015 | Prebil | |
| 2015/0151526 | A1 | 6/2015 | Witte | |
| 2015/0336287 | A1* | 11/2015 | Brown | B29C 33/485 |
| | | | | 264/313 |
| 2016/0009045 | A1 | 1/2016 | Thomas | |
| 2016/0016662 | A1* | 1/2016 | Amari | B29C 70/865 |
| | | | | 473/561 |
| 2016/0101577 | A1 | 4/2016 | Thomas | |
| 2016/0121536 | A1* | 5/2016 | Derx | B29C 48/2562 |
| | | | | 264/476 |
| 2016/0271890 | A1* | 9/2016 | Rihei | B29C 43/305 |

FOREIGN PATENT DOCUMENTS

| | | | |
|---|---|---|---|
| EP | 0689976 A1 * | 1/1996 | F16C 3/28 |
| EP | 2 018 950 A1 | 1/2009 | |
| FR | 1213749 A | 4/1960 | |
| GB | 650067 A | 2/1951 | |
| JP | S 63-167109 A | 7/1988 | |
| JP | H 04-299110 A | 10/1992 | |
| JP | H 09-057862 A | 3/1997 | |
| JP | 3021077 B2 | 3/2000 | |
| JP | 2003-309350 A | 10/2003 | |
| JP | 2014-514189 A | 6/2014 | |
| WO | WO 2006/060895 A1 | 6/2006 | |
| WO | WO 2009/097514 A1 | 8/2009 | |
| WO | WO 2011/046137 A1 | 4/2011 | |

OTHER PUBLICATIONS

Chinese Office Action dated Apr. 4, 2018 in Chinese Patent Application No. 201610154112.1.
Japanese Office Action dated Jun. 20, 2017 issued in Japanese Application No. 2016-031792.
European Communication pursuant to Article 94(3) EPC (First European Office Action) dated Aug. 22, 2017 in European Application No. 16 152 872.4.
Anonymous : "Inclined | Definition of Inclined by Merriam-Webster", Aug. 14, 2017(Aug. 14, 2017),XP055398501, Retrieved from the Internet: URL:https://www.merriam-webster.com/dictionary/inclined [retrieved on Aug. 14, 2017].
English translation of Japanese Office Action dated Jun. 20, 2017 in Japanese Application No. 2016-031792.
Extended European Search Report dated Jul. 31, 2017 in European Application No. 16205672.5.
United States Office Action dated Dec. 12, 2018, in U.S. Appl. No. 15/042,062.
United States Office Action dated Mar. 26, 2019 in U.S. Appl. No. 15/042,062.
Chinese Office Action, dated Jul. 11, 2018, in Chinese Application No. 201611257768.2.
Chinese Office Action in Chinese Patent Application No. 201610154112.1 dated May 11, 2017 with a machine English translation thereof.
Japanese Notification of Reasons for Refusal in Japanese Application No. 2015-056273 dated Jun. 28, 2016 with a machine English translation thereof.
Japanese Decision to Grant a Patent in Japanese Application No. 2015-056273 dated Oct. 18, 2016 with a machine English translation thereof.
Japanese Office Action in JPA No. 2015-056273 dated Jun. 28, 2016.
Extended European Search Report issued in European Patent Application No. 16152872.4 dated Jul. 29, 2016.
Chinese Office Action dated Nov. 15, 2017 in Chinese Application No. 201610154112.1 with an English translation thereof.
United States Office Action dated Jul. 11, 2019, in U.S. Appl. No. 15/042,062.
United States Office Action dated Apr. 10, 2020, in related U.S. Appl. No. 15/042,062.
United States Office Action dated Dec. 10, 2019, in U.S. Appl. No. 15/042,062.

* cited by examiner

COMPOSITE MATERIAL SHAPING DEVICE AND COMPOSITE MATERIAL SHAPING METHOD

CROSS REFERENCES TO RELATED APPLICATIONS

This application is based upon and claims the benefit of priority from Japanese Patent Application No. 2016-031792, filed on Feb. 23, 2016; the entire contents of which are incorporated herein by reference.

FIELD

Implementations described herein relate generally to a composite material shaping device and a composite material shaping method.

BACKGROUND

A composite material, such as glass fiber reinforced plastics (GFRP) or carbon fiber reinforced plastics (CFRP), is formed by laminating and thermal curing of sheet-like prepregs. An airplane part, such as a stringer, a spar, and a rib, sometimes has a T-shaped or I-shaped cross section. In this case, a flatly laminated body of prepregs, a laminated body of prepregs whose cross section is L-shaped or C-shaped, and a laminate body of prepregs whose cross section has a shape line-symmetric to L-shape or C-shape are composed before curing them.

The corner of a laminated body of prepregs bent at a right angle has an R (round) chamfered shape. Thus, when laminated bodies of prepregs each bent at a right angle are disposed and butted symmetrically on a planate laminated body of prepregs, a gap having generally triangular cross section is generated between the laminated bodies of prepregs. More specifically, a gap whose cross section has a shape surrounded by two symmetrical circular arcs corresponding to the symmetrical R chamfers and the straight line appears among the three laminated bodies of prepregs.

Accordingly, the gap formed among the three laminated bodies of prepregs is filled up with a filler. A filler is also generally prepared as a laminated body of prepregs and is thermally cured together with other laminated bodies of prepregs. A rod-shaped filler whose cross section has a shape surrounded by two symmetrical circular arcs and a straight line is called a noodle filler. A noodle filler is made by shaping a round bar-like material consisting of spirally-laminated prepregs.

Generally, the forming of a laminated body of prepregs before thermal curing is called "shaping" in order to distinguish from the forming of a composite material by thermal curing. Then, the forming of a laminated body of prepregs is referred to as "shaping" hereafter.

Conventionally, a mold for shaping is generally used for shaping a laminated body of prepregs. For example, a method of shaping a laminated body of prepregs, placed on a mold, by a vacuum pressure, a method of shaping a laminated body of prepregs by extrusion molding with an extrusion molding device whose die is used as a mold fitted to a shape after the molding and a method of shaping a laminated body of prepregs by pressing a roller to the laminated body of prepregs are known.

However, the shaping method by a vacuum pressure has a problem that the shaping period is long. Specifically, the shaping method by a vacuum pressure requires about several hours to one day of the shaping period. In addition, shaping a bar-shaped filler such as a noodle filler requires the preparation of a mold which can shape the whole filler. Further, shaping with an extrusion molding device requires a large scale device to pull out a laminated body of prepregs because of the great shaping resistance.

On the other hand, a device for pressing a bar-like material with two rollers disposed in parallel is suggested as a device for shaping a noodle filler (for example, refer to Japanese Patent Application Publication JP H04-299110 A). This device allows shaping a noodle filler by interleaving a bar-like material between a columnar roller and a roller having a dent fitted to a shape of the noodle filler, and then feeding the material out.

However, shaping a noodle filler using rollers has a problem that it is difficult to shape the noodle filler with satisfactory quality although the shaping resistance is smaller as compared to that in a case of shaping the noodle filler using an extrusion molding device. As a result, improvement in shaping quality by vacuum shaping of the material disposed in a mold may be required after the noodle filler shaping using the rollers.

In addition, it is occasionally necessary to change a cross-sectional shape of a filler in the length direction, depending on a shape of a gap which is filled up with the filler. When a cross-sectional shape of a filler changes, shaping by a conventional roller becomes unrealistic. Therefore, in general, a filler whose cross-sectional shape changes is shaped using a mold whose cross-sectional shape changes in the length direction. Alternatively, a method of changing a cross-sectional shape of a filler in a stepwise shape with preparing rollers and/or dies, having different sizes, can be considered.

However, in case that a filler is shaped using rollers and/or dies, having different sizes, it is necessary to dispose the rollers and/or the dies, respectively, according to positions at which a cross-sectional shape of a filler changes. In this case, a point at which a filler is shaped using rollers and/or dies becomes far from a point at which the filler is supplied. Accordingly, a filler heated at the time of supply is cooled at the time of shaping, which causes a problem that shapability deteriorates. In order to avoid this decrease in temperature of a filler, a complicated mechanism for warming rollers and/or dies during shaping is necessary. Furthermore, in case that a filler is shaped using rollers and/or dies, having different sizes, there is also a problem that a cross-sectional shape of a filler cannot be changed continuously.

In particular, in case that a filler whose cross-sectional shape changes continuously is shaped, there is no method other than a method of using a mold, from such a background. However, in case that a filler is shaped using a mold, there is a problem that the shaping period is long at normal temperature. In order to shape a filler in a short time using a mold, it is necessary to use heating by a heating furnace or the like, and/or pressurization by a pressing machine or an autoclave apparatus together. Therefore, it is necessary to use a plurality of equipment or to perform a plurality of processes in a conventional shaping method in order to shape a filler, whose cross-sectional shape changes, in a short time.

Accordingly, an object of the present invention is to easily perform shaping bar-like prepregs such as shaping a noodle filler for filling a gap formed in laminated bodies of prepregs whose cross section has T-shape, I-shape or the like.

Furthermore, another object of the present invention is to enable shaping a filler, whose cross-sectional shape changes continuously, or the like more simply.

SUMMARY OF THE INVENTION

In general, according to one implementation, a composite material shaping device includes three rollers and an angle adjusting structure. The three rollers apply pressures on a laminated body of prepregs, from different directions. The prepregs are laminated in a bar shape. The angle adjusting structure continuously changes an angle of a rotating axis of at least one roller out of the three rollers.

Further, according to one implementation, a composite material shaping method includes applying pressures on a laminated body of prepregs laminated in a bar shape, from different directions, using three rollers; and producing a shaped laminated body of the prepregs by continuously changing an angle of a rotating axis of at least one roller out of the three rollers.

DETAILED DESCRIPTION

A composite material shaping device and a composite material shaping method according to implementations of the present invention will be described with reference to the accompanying drawings.

(First Implementation)
(Structure and Function)

Figure 1:
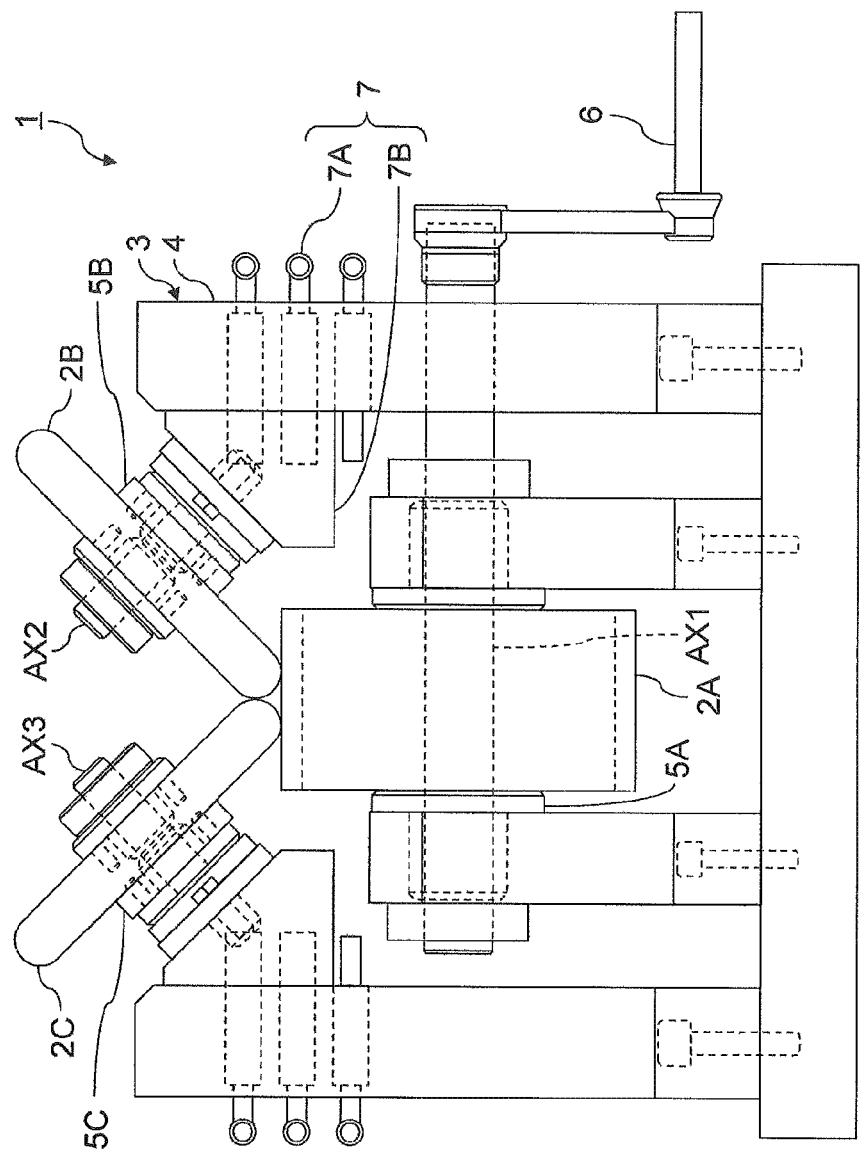
FIG. 1 is a front view of a composite material shaping device according to the first implementation of the present invention.
Figure 2:
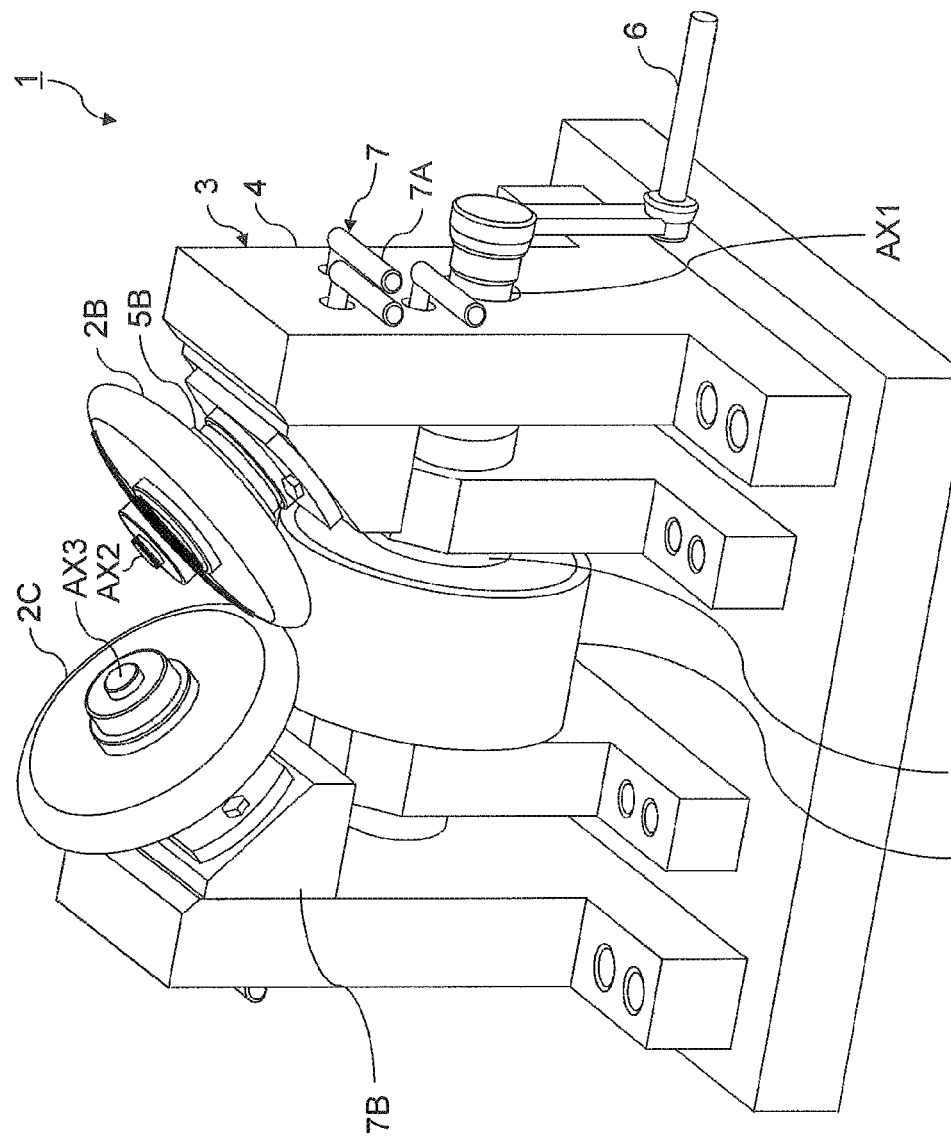
FIG. 2 is a perspective view of the composite material shaping device shown in FIG. 1.
Figure 3:
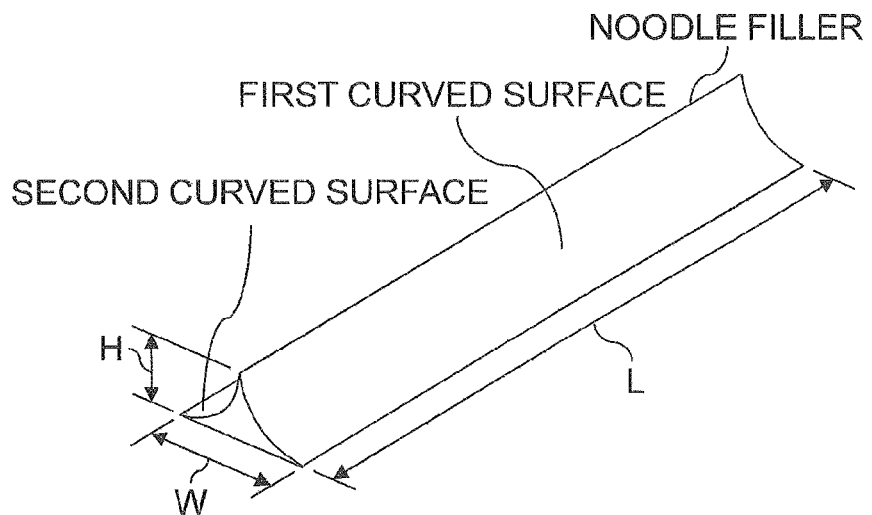
FIG. 3 is a perspective view showing a shape of a noodle filler which is a target of shaping by the composite material shaping device shown in FIG. 1.

FIG. 1 is a front view of a composite material shaping device according to the first implementation of the present invention, FIG. 2 is a perspective view of the composite material shaping device shown in FIG. 1, and FIG. 3 is a perspective view showing a shape of a noodle filler which is a target of shaping by the composite material shaping device shown in FIG. 1.

A composite material shaping device 1 performs shaping of a noodle filler using a laminated body of prepregs laminated in a bar shape as a material. A noodle filler fills a gap caused by placing two symmetrically butted laminated bodies of prepregs, which have been bent at right angles respectively, on a laminated body of prepregs which has been laminated in a flat plate or in a slightly curved plate.

Therefore, a noodle filler is a bar-shaped filler whose cross-sectional shape is a shape surrounded by two symmetrical arcs and a straight line as shown in FIG. 3. Specifically, the noodle filler has a shape surrounded by a rectangular plane having a width of W and a length of L, the first curved surface whose cross-section is an arc, and the second curved surface which is symmetrical to the first curved surface. Therefore, the height H of the noodle filler becomes a distance between the line of intersection of the first curved surface and the second curved surface, and the rectangular plane.

Typically, an approximately round rod-shaped laminated body of prepregs, manufactured by spirally rolling a prepreg, is used as a material of the noodle filler. Shaping of the noodle filler is forming processing that forms a plane having a width of W and a length of L, the first curved surface whose cross-section is an arc, and the second curved surface which is symmetrical to the first curved surface, on an approximately round rod-shaped material.

The composite material shaping device 1 has three rollers 2A, 2B, and 2C, and a rotating structure 3. The three rollers 2A, 2B, and 2C apply pressures on a laminated body of prepregs, laminated in a bar shape, from different angles. Meanwhile, the rotating structure 3 rotates the three rollers 2A, 2B, and 2C. The three rollers 2A, 2B, and 2C shape one plane and two curved surfaces of a noodle filler, respectively. Therefore, the three rollers 2A, 2B, and 2C rotate around the three axes AX1, AX2, and AX3 by three shafts, which are not parallel to each other, respectively. Specifically, the first, second, and third rollers 2A, 2B, and 2C are disposed so as to form a space, corresponding to a cross-sectional shape of a noodle filler surrounded by two line-symmetric arcs and one straight line, among the first, second, and third rollers 2A, 2B, and 2C.

More specifically, the first roller 2A rotates around the first axis AX1 by the first shaft. The second roller 2B rotates around the second axis AX2, which inclines relative to the first axis AX1, by the second shaft. The third roller 2C rotates around the third axis AX3 by the third shaft of which the third axis AX3 inclines relative to the first shaft AX1 and is symmetrical to the second axis AX2 with respect to a plane perpendicular to the first axis AX1.

The first roller 2A shapes a plane having a width of W and a length of L. Therefore, the first roller 2A can be a cylindrical roller which rotates around the horizontal first axis AX1. The second roller 2B shapes a curved surface corresponding to one R chamfer of a noodle filler. Therefore, the second roller 2B can be a disk-shaped roller whose radius of the circumference portion is a radius of the R chamfer of the noodle filler. The third roller 2C shapes a curved surface corresponding to the other R chamfer of the noodle filler. Therefore, the third roller 2C can be also a disk-shaped roller whose radius of the circumference portion is the radius of the R chamfer of the noodle filler, similar to the second roller 2B.

Since R chamfers of a noodle filler become plane symmetry, the second axis AX2 of the second roller 2B and the third axis AX3 of the third roller 2C become symmetrical to each other with respect to the plane perpendicular to the first axis AX1, as described above. It is important to determine inclined angles of the second axis AX2 and the third axis AX3 to the first axis AX1 to be angles appropriate for shaping of a noodle filler. The angles of the second axis AX2 and the third axis AX3 appropriate for shaping of a noodle filler can be determined from various viewpoints.

As the first method of determining each inclined angle of the second axis AX2 and the third axis AX3, a method of determining each angle so that pressures are applied on three sides of a round rod-shaped material as uniformly as possible can be adopted. In this case, when the cross-sectional shape of a noodle filler is approximated to an isosceles right triangle, a method of determining angles so that the second axis AX2 and the third axis AX3 are inclined at ±45 degrees relative to the first axis AX1 respectively can be considered since the inclined angles of two sides with a right angle therebetween of the isosceles right triangle become ±45 degrees relative to the base.

Alternatively, a method of determining the inclined angles of the second axis AX2 and the third axis AX3 from the first axis AX so that compressed distances of a material by the first, second, and third rollers 2A, 2B, and 2C, respectively, become as equal as possible can also be considered.

Figure 4:
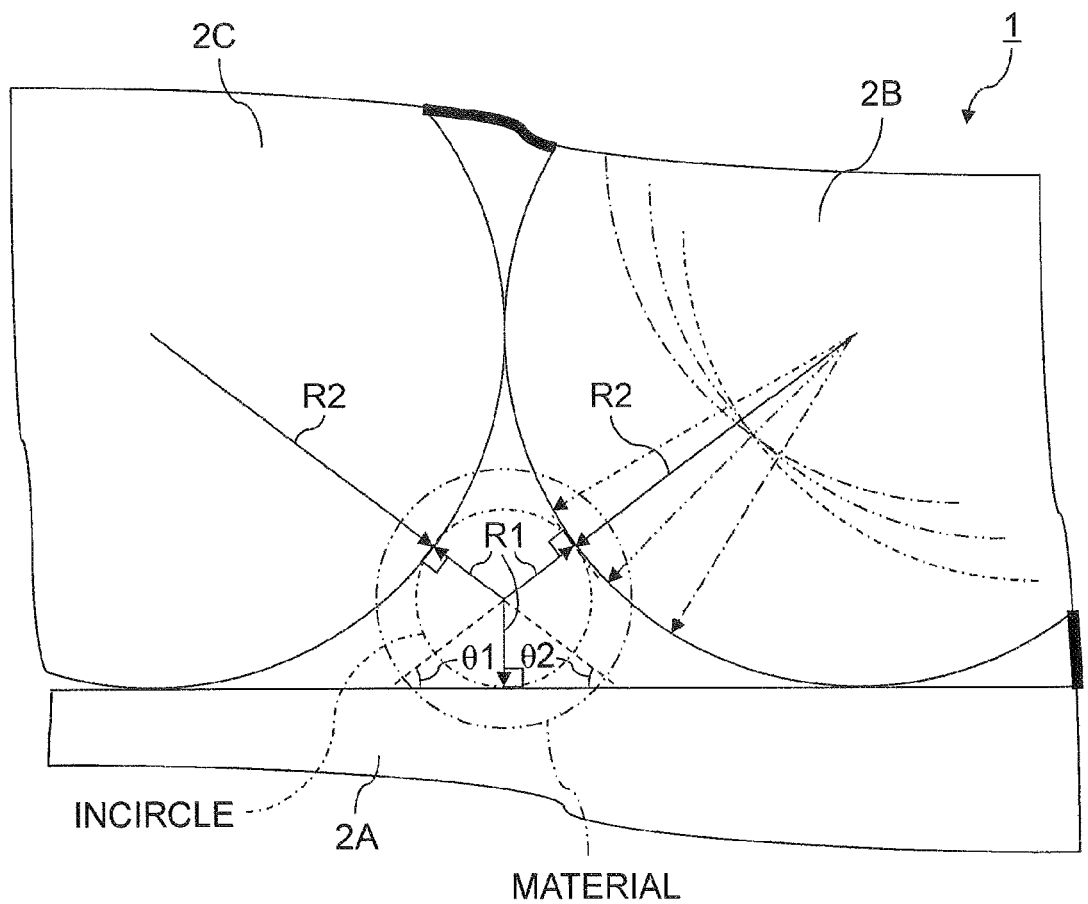
FIG. 4 explains a method of determining the inclined angles of the second axis and the third axis from the first axis shown in FIG. 1.
Figure 5:
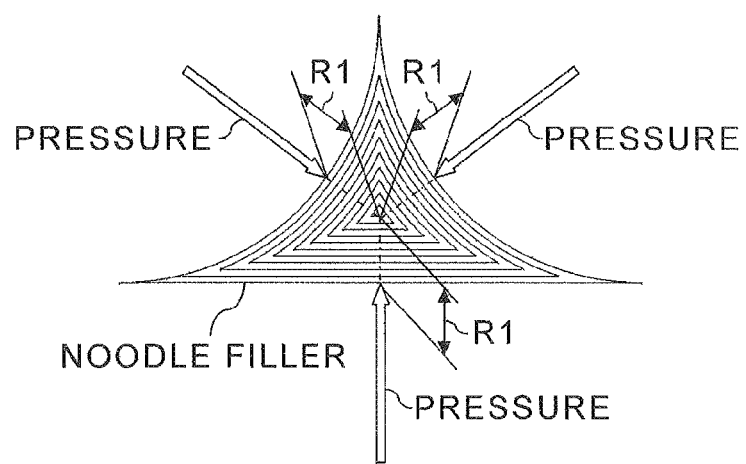
FIG. 5 is a cross-sectional view of a noodle filler which is shaped by pressing the first, second, and third rollers at the angles shown in FIG. 4.

FIG. 4 explains a method of determining the inclined angles of the second axis AX2 and the third axis AX3 from the first axis AX1 shown in FIG. 1. FIG. 5 is a cross-sectional view of a noodle filler which is shaped by pressing the first, second, and third rollers 2A, 2B, and 2C at the angles shown in FIG. 4.

As shown in FIG. 4, when the incircle which is tangent to the first, second, and third rollers 2A, 2B, and 2C is considered, the distances from the center of the incircle to the respective tangent points between the rollers 2A, 2B, and 2C and the incircle become equal to each other. Therefore, when the rollers 2A, 2B, and 2C are pressed against the material at angles of line segments connecting the center of the incircle with the tangent points to the rollers 2A, 2B, and 2C, respectively, each of the maximum distances by which three sides of the material are compressed becomes a difference between a radius of the material before compression and a radius of the material after the compression. Thus, compressive forces are considered to be able to be applied uniformly on the three sides of the material as shown in FIG. 5.

In this case, when the radius of the incircle is expressed by R1 and the radius of tips of the first and second rollers 2A, 2B and a radius of R chamfer of a noodle filler are expressed by R2, $(R1+R2)^2=R2^2+(R2-R1)^2$ is satisfied based on the Pythagorean theorem, thereby a relation of $4R1=R2$ is satisfied. Therefore, the angle θ1 formed between the surface of the first roller 2A and the direction in which the second roller 2B is pressed becomes θ1=36.87 degrees based on expression (1).

$$\cos θ1 = R2/(R1+R2) = 4R1/(R1+4R1) = 4/5 \quad (1)$$

When a direction of measuring the angle θ1 at which the second roller 2B is pressed against the first roller 2A is the positive direction, the angle θ2 formed between the surface of the first roller 2A and the direction in which the third roller 2C is pressed becomes θ2=−36.87 degrees, similarly. That is, when an inclined angle of the second axis AX2 of the second roller 2B to the first axis AX1 of the first roller 2A is set to −90+36.87=−53.13 degrees while an inclined angle of the third axis AX3 of the third roller 2C to the first axis AX1 of the first roller 2A is set to +53.13 degrees, the maximum compressed distances of a material by the first, second, and third rollers 2A, 2B, and 2C, respectively, can be equalized.

Since manufacturing errors actually arise, the inclined angles of the second axis AX2 and the third axis AX3 to the first axis AX1 should be designed as angles within a predetermined tolerance from ±53.13 degrees respectively.

Note that, even when a filler has a shape whose cross-section is not line-symmetric, the respective inclined angles of the second axis AX2 and the third axis AX3 to the first axis AX1 can be determined similarly so that a difference between a radius of an incircle which is tangent to the first, second, and third rollers 2A, 2B, and 2C, and a radius of a material before compression becomes the maximum compression distances by the first, second, and third rollers 2A, 2B, and 2C.

Shaping of noodle fillers was actually tested by setting the inclined angles of the second axis AX2 and the third axis AX3 to the first axis AX1 to ±30 degrees, ±45 degrees, and ±60 degrees in order to examine which of a method to set the inclined angles of the second axis AX2 and the third axis AX3 to the first axis AX1 to ±45 degrees by approximating a cross-sectional shape of a noodle filler to an isosceles right triangle, and a method to set the inclined angles of the second axis AX2 and the third axis AX3 to the first axis AX1 to ±53.13 degrees so that the maximum compression distances of a material by the first, second, and third rollers 2A, 2B, and 2C become equivalent to each other is appropriate.

As a result, it was confirmed that a noodle filler could be shaped most uniformly by the smallest power when the inclined angles of the second axis AX2 and the third axis AX3 to the first axis AX1 had been set to ±60 degrees. Furthermore, it was confirmed that a noodle filler could also be shaped in quality equivalent to that by the conventional method of shaping a noodle filler by a vacuum pressure when the inclined angles of the second axis AX2 and the third axis AX3 to the first axis AX1 had been set to ±45 degrees.

According to the result of the shaping tests as described above, it is preferable to dispose the first, second, and third rollers 2A, 2B, and 2C so that each inclined angle of the second axis AX2 and the third axis AX3 to the first axis AX1 is not less than 45 degrees and not more than 60 degrees, in other words, to set each absolute value of the angles θ1 and θ2, formed between the surface of the first roller 2A and the directions in which the second roller 2B and the third roller 2C are pressed, to not less than 30 degrees and not more than 45 degrees, from a viewpoint of applying compressive forces on three sides of a material uniformly. In particular, it can be considered that it is more preferable to set the inclined angles of the second axis AX2 and the third axis AX3 to the first axis AX1, to angles within a predetermined tolerance from ±53.13 degrees respectively, that is, to set the angles θ1 and θ2, formed between the surface of the first roller 2A and the directions in which the second roller 2B and third roller 2C are pressed, to ±36.87 degrees.

Meanwhile, according to the result of the shaping tests, it was confirmed that the smaller the inclined angles of the second axis AX2 and the third axis AX3 to the first axis AX1 are, the more flatness of the flat undersurface of a noodle filler shaped by the first roller 2A is improved. That is, the closer the angles θ1 and θ2, at which the second roller 2B and the third roller 2C are pressed, are to the vertical direction, the more flatness of the undersurface of a noodle filler can be improved. Nevertheless, when the angles θ1 and θ2, at which the second roller 2B and the third roller 2C are pressed, are brought extremely close to the vertical direction, uniformity of layers inside a noodle filler deteriorates.

Therefore, as the second method of determining the respective inclined angles of the second axis AX2 and the third axis AX3, a method of disposing the first, second, and third rollers 2A, 2B, and 2C so that each of the inclined angles of the second axis AX2 and the third axis AX3 to the first axis AX1 become not less than 10 degrees and not more than 40 degrees can be adopted from a viewpoint of improving flatness of the undersurface of a noodle filler. That is, it is preferable to set each absolute value of the angles θ1 and θ2, at which the second roller 2B and the third roller 2C are pressed, to not less than 50 degrees and not more than 90 degrees in order to improve flatness of the undersurface of a noodle filler.

As described above, a preferable range of the inclined angles of the second axis AX2 and the third axis AX3 to the first axis AX1 changes depending on which of the uniformity of layers inside a noodle filler and the flatness of the undersurface of the noodle filler is emphasized.

Specific shapes and sizes of the first, second, and third rollers 2A, 2B, and 2C can be determined depending on a size of a noodle filler. For example, radii at the end portions of the second roller 2B and the third roller 2C can be determined to radii at R chamfer portions of a noodle filler, respectively. Furthermore, the length of the first roller 2A should be determined to at least a length which can cover the undersurface of a noodle filler.

Diameters of the first, second, and third rollers 2A, 2B, and 2C can be determined to arbitrary lengths. Note that, the longer the diameters of the first, second, and third rollers 2A, 2B, and 2C are, the more a feed speed of a material can be increased since a feeding amount of the material per rotation of each of the rollers 2A, 2B, and 2C can be lengthened.

The first, second, and third rollers 2A, 2B, and 2C are desirable to have releasability from a laminated body of prepregs which is a material of a noodle filler. As a result of examination of the releasability, which was actually performed using polyurethane, polytetrafluoroethylene, and nylon 6,6 as a material, it was confirmed that polyurethane has a low releasability while polytetrafluoroethylene and nylon 6,6 have satisfactory releasability. In particular, it was confirmed that polytetrafluoroethylene has the most satisfactory releasability.

Therefore, nylon 6,6 or polytetrafluoroethylene is preferable as a material for the rollers 2A, 2B, and 2C, from a viewpoint of securing the releasability from prepregs. Hence, at least one surface layer of the three rollers 2A, 2B, and 2C is desirable to be made of nylon 6,6 or polytetrafluoroethylene as a material. Note that, each surface of the rollers 2A, 2B, and 2C may be covered with a film or a tape of nylon 6,6, polytetrafluoroethylene or the like, which has releasability, instead of making the whole rollers 2A, 2B, and 2C with a material having releasability. Nylon is a general term for polyamide involving an aliphatic skeleton. Nylon 6,6 is a nylon whose molecular structure is expressed by $\{CO-(CH_2)_4-CO-NH-(CH_2)_6-NH\}_n$.

The rotating structure 3 is a device for rotating the first, second, and third rollers 2A, 2B, and 2C. Therefore, the rotating structure 3 can be composed by disposing the first bearing 5A, the second bearing 5B and the third bearing 5C on the stand 4. The first bearing 5A bears the first shaft of the first roller 2A rotating around the first axis AX1. The second bearing 5B bears the second shaft of the second roller 2B rotating around the second axis AX2. The third bearing 5C bears the third shaft of the third roller 2C rotating around the third axis AX3.

The first bearing 5A has a structure that bears the first shaft, protruding from the cylindrical first roller 2A in the both sides, at two positions in the both sides of the first roller 2A. The second bearing 5B and the third bearing 5C have structures that bear the second shaft and third shaft of the disk-shaped second roller 2B and third roller 2C at predetermined inclined angles, respectively.

It is desirable to use an oilless bush, instead of a ball bearing, for each of the first bearing 5A, the second bearing 5B, and the third bearing 5C. That is, it is desirable to configure each of the three rollers 2A, 2B, and 2C to rotate with an oilless bush as a bearing. This is because use of oil which is not desirable for shaping of prepregs can be avoided when an oilless bush is used as a bearing. In addition, when an oilless bush is used, oiling work can also be unnecessary.

Furthermore, the rotating structure 3 has a handle 6 which gives rotative power to at least one of the first, second, and third rollers 2A, 2B, and 2C. In the example shown in the figures, the handle 6 is coupled to the first shaft, in the horizontal direction, which is a rotating shaft of the first roller 2A. Therefore, when the handle 6 is rotated, the first roller 2A rotates around the first axis AX1.

In a state where a material is inserted in a gap among the first, second, and third rollers 2A, 2B, and 2C, a rotation of the first roller 2A also causes rotations of the second and third rollers 2B and 2C due to friction force among the first, second, and third rollers 2A, 2B, and 2C, and the material. Therefore, when the handle 6 is rotated, the first, second, and third rollers 2A, 2B, and 2C can be rotated with extruding the material. Thereby, pressures can be applied on a laminated body of prepregs laminated in a bar shape, at angles different from each other, using the three rollers 2A, 2B, and 2C. As a result, the laminated body of prepregs laminated in a bar shape can be shaped as shown in FIG. 5. That is, a noodle filler can be shaped.

As described above, preferable inclined angles of the second roller 2B and the third roller 2C differ depending on which of the uniformity of a noodle filler or the flatness of the undersurface of the noodle filler is emphasized.

Thus, the composite material shaping device 1 can have inclination angle adjusting structures 7 for changing inclined angles of the second axis AX2 and the third axis AX3 to the first axis AX1. In the example shown in the figures, the second bearing 5B and the third bearing 5C have been attached to the replacement type inclination angle adjusting structures 7, respectively.

Each of the inclination angle adjusting structures 7 can be composed of bolts with levers 7A and a block 7B. The block 7B can be fixed to the stand 4 by the bolts with levers 7A. An inclined surface for setting the second bearing 5B or the third bearing 5C is formed on each block 7B. Inclined angles of the inclined surfaces formed on the blocks 7B are inclined angles of the second roller 2B and the third roller 2C, respectively. Thus, the inclined angles of the second roller 2B and the third roller 2C can be changed by preparing pairs of the blocks 7B on which the inclined surfaces different in the inclined angles have been formed.

Figure 6:
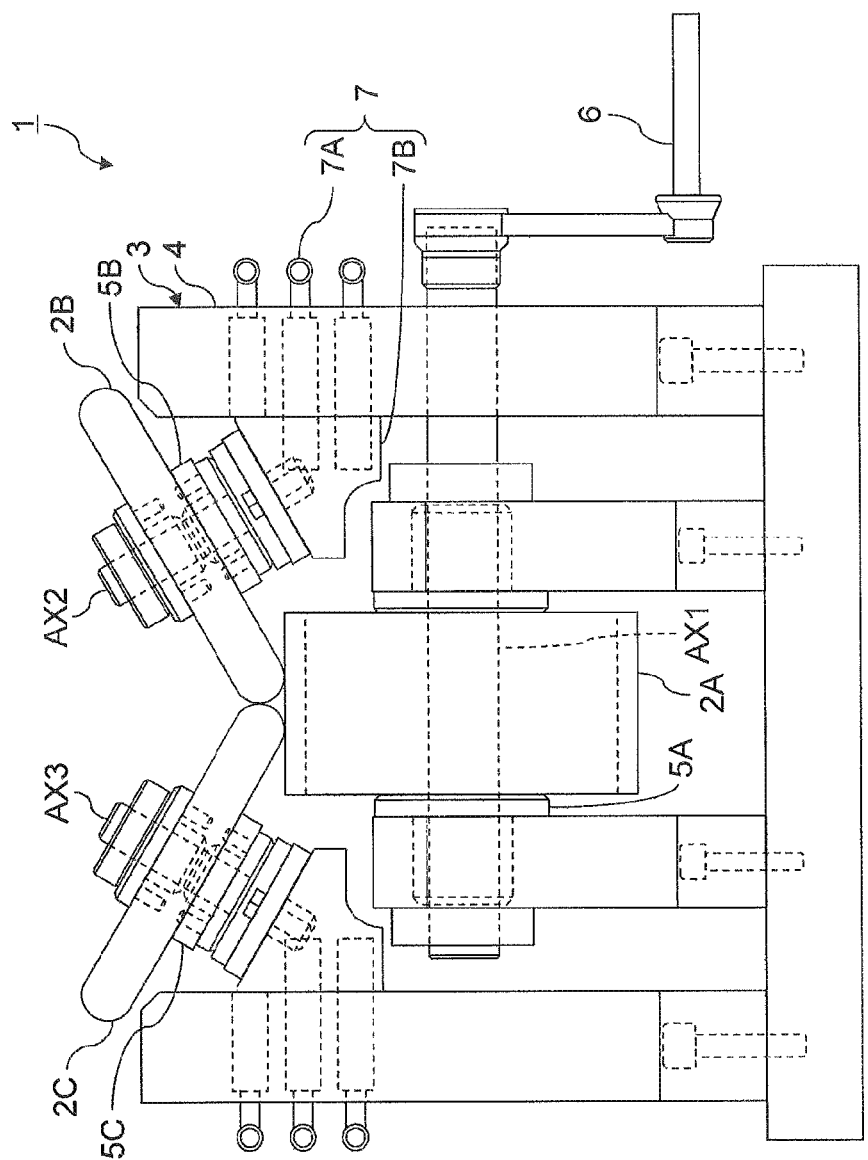
FIG. 6 shows the first example of changing the inclined angles of the second roller and the third roller.
Figure 7:
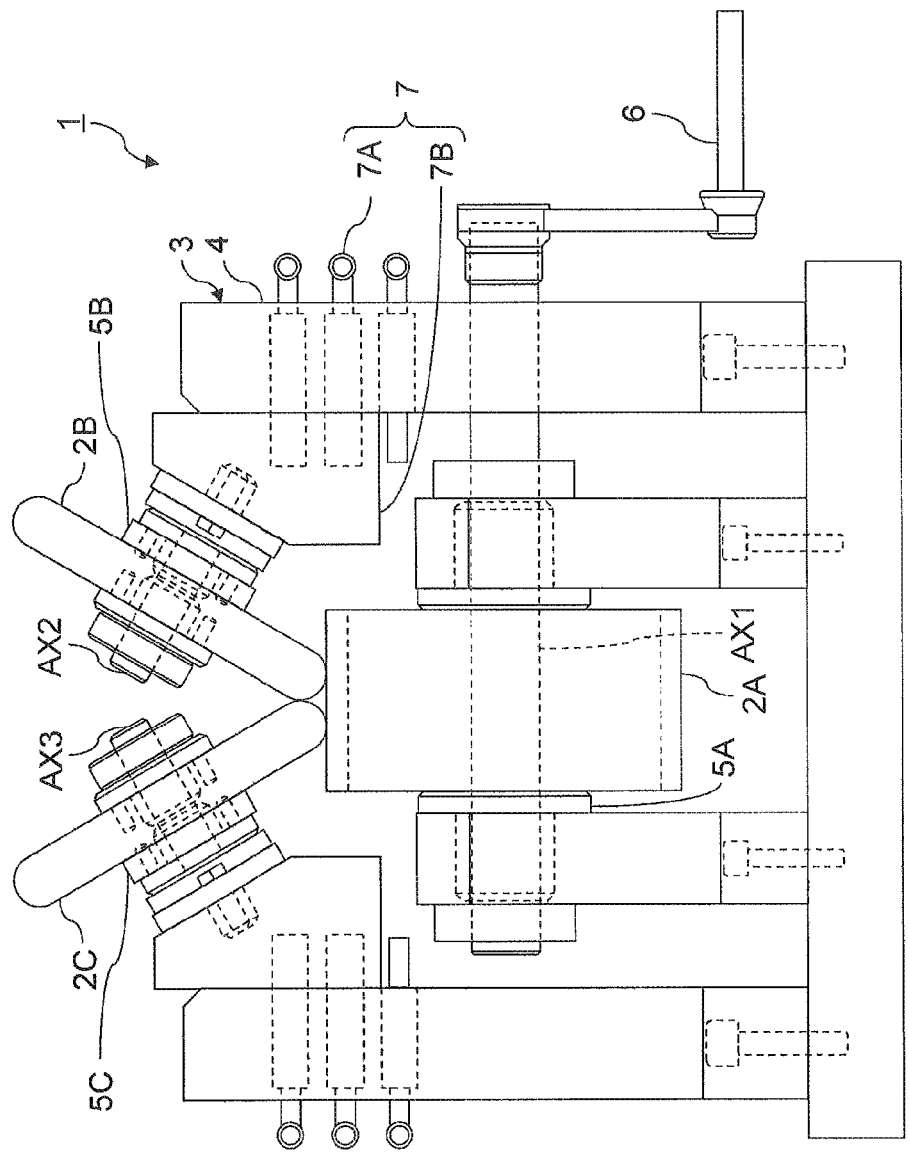
FIG. 7 shows the second example of changing the inclined angles of the second roller and the third roller.

FIG. 6 shows the first example of changing the inclined angles of the second roller 2B and the third roller 2C. FIG. 7 shows the second example of changing the inclined angles of the second roller 2B and the third roller 2C.

As shown in FIG. 6 and FIG. 7, each of the blocks 7B, on which inclined surfaces different in inclined angles have been formed, can be fixed to the stand 4, and the second bearing 5B and the third bearing 5C can be installed on the blocks 7B, respectively. Thereby, the second axis AX2 and the third axis AX3 can be set in the perpendicular directions to the inclined surfaces of the blocks 7B, respectively. That is, the inclined angles of the second roller 2B and the third roller 2C can be set at predetermined angles.

Note that, not only limited to the examples shown in the figures, the composite material shaping device 1 may also have inclination angle adjusting structures which can continuously change inclined angles of the second roller 2B and the third roller 2C so that the inclined angles of the second roller 2B and the third roller 2C can be fine-adjusted. Alternatively, the composite material shaping device 1 may have inclination angle adjusting structures which can intermittently change the inclined angles of the second roller 2B and the third roller 2C so that the inclined angles of the second roller 2B and the third roller 2C become preferable inclined angles.

As described above, the composite material shaping device 1 and the composite material shaping method are to shape prepregs, such as a noodle filler, by disposing the three rollers 2A, 2B, and 2C at predetermined angles, and compressing a material from three different directions by the three rollers 2A, 2B, and 2C.

(Effects)

Thus, the composite material shaping device 1 and the composite material shaping method allow high-quality shaping of prepregs, with a simpler structure and in a shorter time than those in the conventional device and method. For example, in the conventional method of shaping a filler by giving displacement only in the vertical direction using two rollers having special shapes fitting a shape of the filler, sufficient quality could not be obtained and shaping by a vacuum pressure was occasionally necessary. By contrast, the composite material shaping device 1 and the composite material shaping method allow shaping a filler with sufficient quality since pressures can be given more uniformly from three directions using the three rollers 2A, 2B, and 2C. Hence, shaping by a vacuum pressure becomes unnecessary. Furthermore, a large scale device, such as an extrusion molding device, is also unnecessary.

Furthermore, a filler can be shaped with a smaller power by pressing the three rollers 2A, 2B, and 2C on a material at angles at which pressures become more uniform. This has also been confirmed by shaping tests with changing angles of the rollers 2B and 2C.

(Second Implementation)

(Structure and Function)

Figure 8:
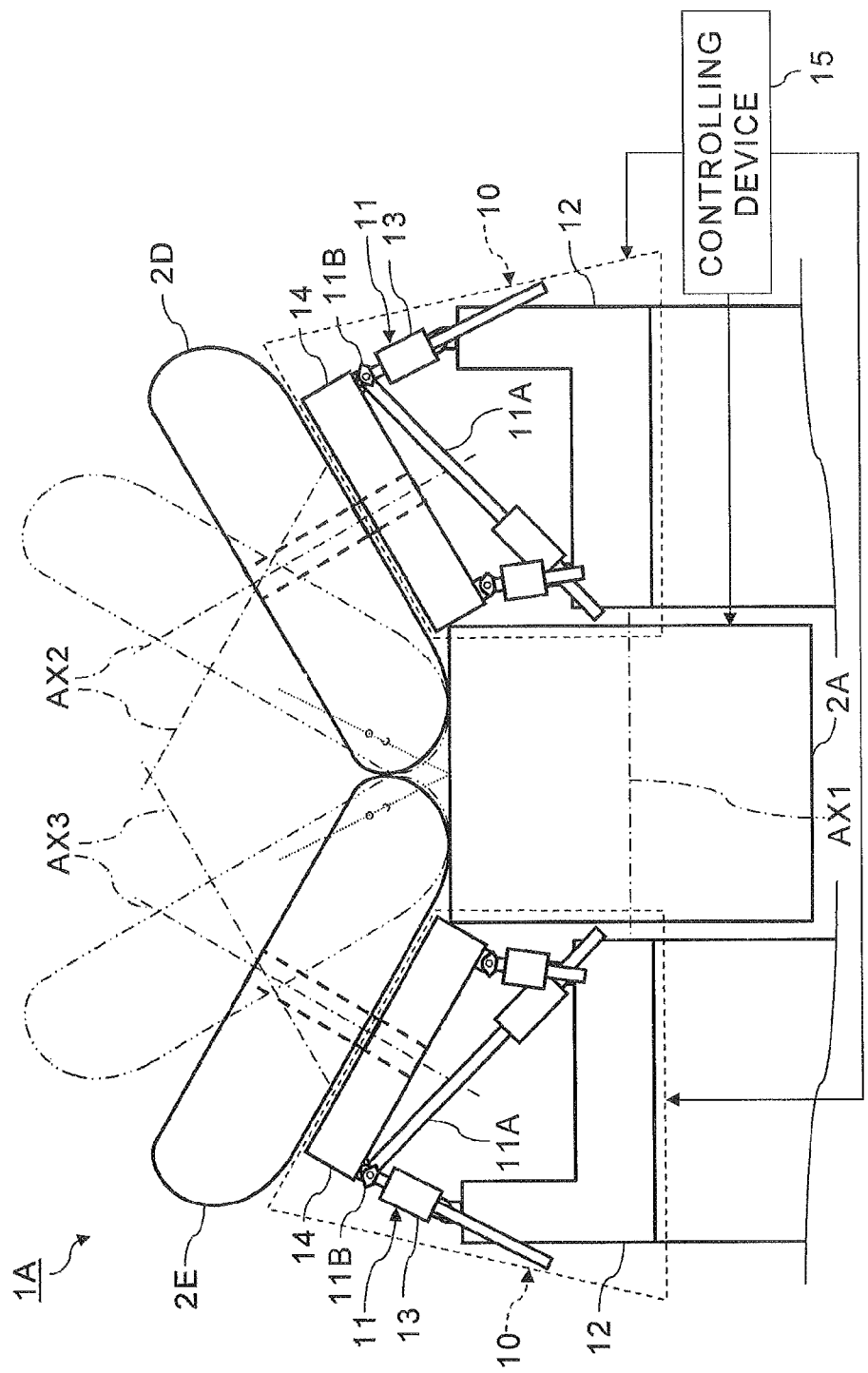
FIG. 8 is a front view of a composite material shaping device according to the second implementation of the present invention.
Figure 9:
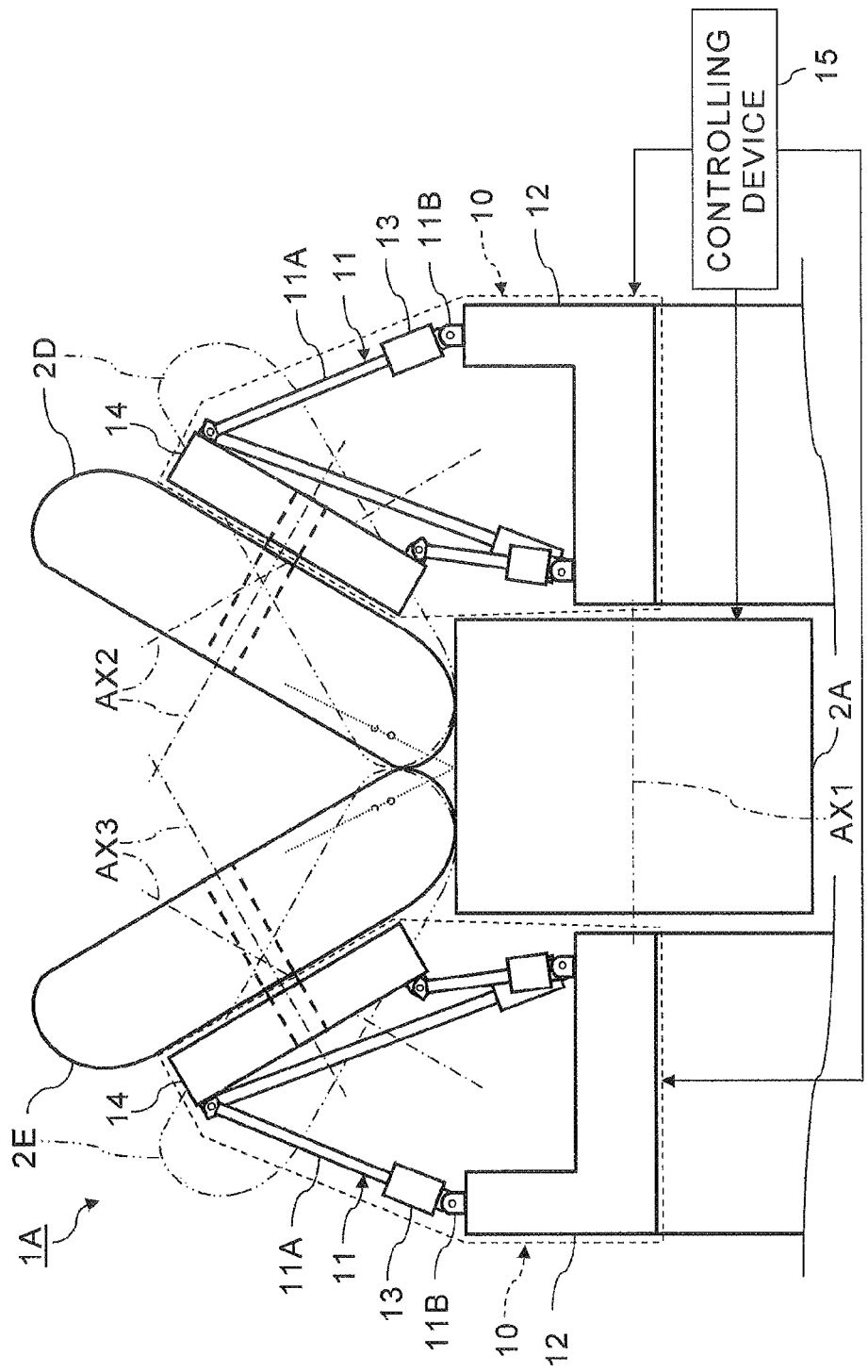
FIG. 9 shows a state where directions of rollers of the composite material shaping device shown in FIG. 8 have been changed.

FIG. 8 is a front view of a composite material shaping device according to the second implementation of the present invention. FIG. 9 shows a state where directions of rollers of the composite material shaping device shown in FIG. 8 have been changed.

A composite material shaping device 1A in the second implementation shown in FIG. 8 is different from the composite material shaping device 1 in the first implementation in a point that the shapes of the second and third rollers 2D, 2E are different from those of the second and third rollers 2B, 2C, and angle adjusting structures 10 which change angles of rotating axes of the second and third rollers 2D, 2E respectively have been disposed. Other structures and functions of the composite material shaping device 1A in the second implementation are not substantially different from those of the composite material shaping device 1 in the first implementation. Therefore, only main elements are shown, and the same elements or corresponding elements are shown by the same signs with their explanations omitted.

The composite material shaping device 1A in the second implementation also has three rollers, i.e., the first roller 2A, the second roller 2D, and the third roller 2E. The three rollers 2A, 2D, and 2E apply pressures on a laminated body of prepregs, laminated in a bar shape, from directions different from each other. The first roller 2A has a linear shape in a longitudinal section at a portion contacting with a laminated body of prepregs, similarly to the first implementation.

Meanwhile, the second roller 2D has a curved shape, whose curvature is not constant, at a portion applying a pressure on a laminated body of prepregs, in a longitudinal section including the second axis AX2 of the second roller 2D. Similarly, the third roller 2E also has a curved shape, whose curvature is not constant, at a portion applying a pressure on a laminated body of prepregs, in a longitudinal section including the third axis AX3 of the third roller 2E.

Therefore, a laminated body of prepregs can be shaped to a shape corresponding to a curvature of an edge of the second roller 2D when a portion of the second roller 2D, which contacts with the laminated body of prepregs, is changed by changing a direction in which the second roller 2D applies a pressure on the laminated body of prepregs. Similarly, a laminated body of prepregs can be shaped to a shape corresponding to a curvature of an edge of the third roller 2E when a portion of the third roller 2E, which contacts with the laminated body of prepregs, is changed by changing a direction in which the third roller 2E applies a pressure on the laminated body of prepregs.

A logarithmic spiral is mentioned as a practical example of a curve having a non-constant curvature for respectively determining a sectional shape of an edge of the second roller 2D and a sectional shape of an edge of the third roller 2E, each of which contact with and apply pressures on a bar-shaped laminated body of prepregs.

Figure 10:
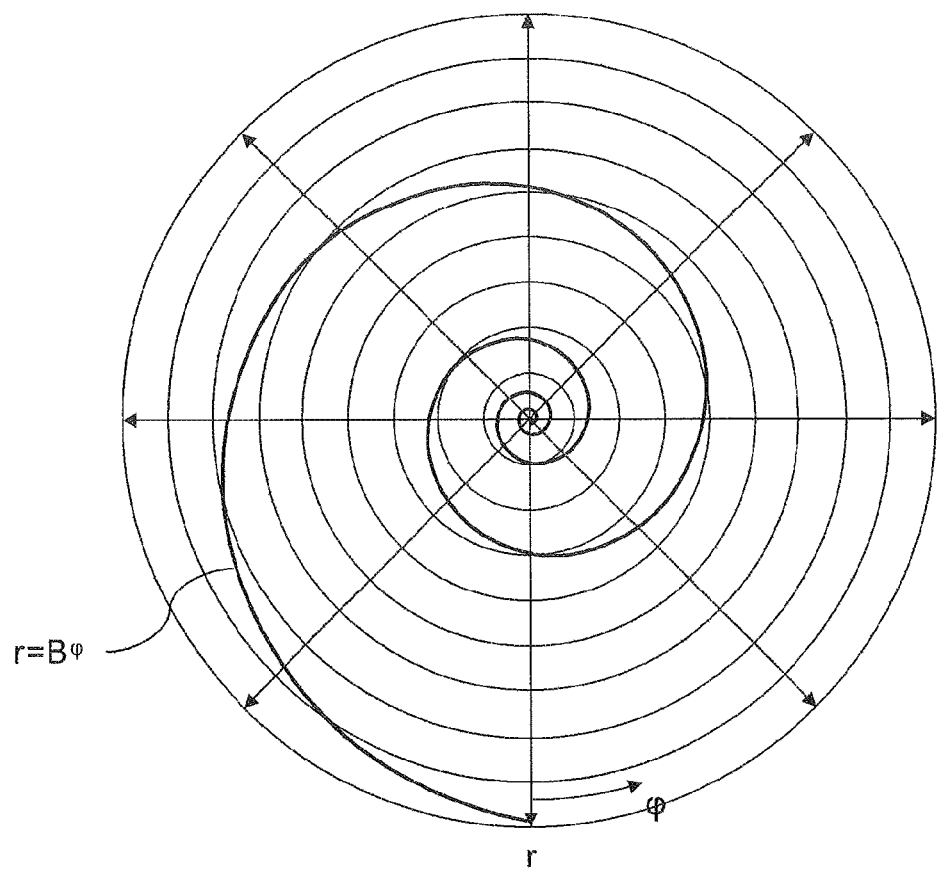
FIG. 10 shows an example of a logarithmic spiral for respectively determining a shape of an edge of the second roller and a shape of an edge of the third roller, which are shown in FIG. 8.

FIG. 10 shows an example of a logarithmic spiral for respectively determining a shape of an edge of the second roller 2D and a shape of an edge of the third roller 2E, which are shown in FIG. 8.

A logarithmic spiral is a curve defined by expression (1), in polar coordinates $(r, \varphi)$ where a distance from the origin is expressed by r and an angle from a reference direction is expressed by $\varphi$.

$$r = B^{\varphi} \tag{1}$$

wherein, in expression (1), B is a positive coefficient which is not 1. When the coefficient B of a logarithmic spiral defined by expression (1) is determined and the logarithmic spiral is plotted on the polar coordinates $(r, \varphi)$, a spiral curve as shown in FIG. 10 is drawn.

A logarithmic spiral has characteristics of self-similarity. Specifically, curves cut from a logarithmic spiral have a relationship of similarity when the central angles are constant. For example, a curve obtained by setting an intersection of two straight lines, between which an angle of 90 degrees is formed, to the origin of the polar coordinates $(r, \varphi)$, and cutting a partial logarithmic spiral between intersections of the original logarithmic spiral and the two straight lines is enlarged or reduced to a similar figure when the two straight lines are rotated around the origin. That is, when different portions of a logarithmic spiral are each cut by two straight lines between which an angle of 90 degrees is formed and which pass through the origin, curves having a relationship of similarity are obtained. This relationship is also similar when an angle formed by two straight lines for cutting a curve from a logarithmic spiral is not 90 degrees.

Thus, a shape of the second roller 2D, at a portion applying a pressure on a laminated body of prepregs, in a longitudinal section including the second axis AX2 of the second roller 2D and a shape of the third roller 2E, at a portion applying a pressure on the laminated body of prepregs, in a longitudinal section including the third axis AX3 of the third roller 2E can be a part of a logarithmic spiral, respectively.

In this case, a shape of a gap formed among the first, second, and third rollers 2A, 2D, and 2E can be enlarged and reduced with keeping a relationship of similarity when an inclined angle of the second axis AX2 of the second roller 2D to the first axis AX1 of the first roller 2A and an inclined angle of the third axis AX3 of the third roller 2E to the first axis AX1 of the first roller 2A are changed respectively with making the first roller 2A, the second roller 2D, and the third roller 2E contact with each other so that the inclined angles become symmetrical with respect to a plane perpendicular to the first axis AX1. That is, a gap formed among the first, second, and third rollers 2A, 2D, and 2E can be enlarged and reduced when the inclined angles of the second roller 2D and the third roller 2E are changed with keeping plane symmetric property of the second roller 2D and the third roller 2E.

Thus, the composite material shaping device 1A has the angle adjusting structures 10 which respectively change angles of the second axis AX2 of the second roller 2D and the third axis AX3 of the third roller 2E, continuously or intermittently.

Specifically, each of the angle adjusting structures 10 has functions to change an inclined angle of the second axis AX2 of the second roller 2D to the first axis AX1 of the first roller 2A or an inclined angle of the third axis AX3 of the third roller 2E to the first axis AX1 of the first roller 2A. Therefore, a plurality of noodle fillers having different cross-sectional shapes can be manufactured using the common composite material shaping device 1A when an inclined angle of the second axis AX2 of the second roller 2D to the first axis AX1 of the first roller 2A and an inclined angle of the third axis AX3 of the third roller 2E to the first axis AX1 of the first roller 2A are changed for every material.

In particular, when a sectional shape of each edge of the second and third rollers 2D, 2E is a logarithmic spiral, a shape of a gap for shaping can be enlarged and reduced freely with keeping a relationship of similarity, by changing inclined angles of the second roller 2D and the third roller 2E. Therefore, a plurality of noodle fillers which have a relationship of similarity and different sizes can be manufactured using the common composite material shaping device 1A.

Meanwhile, when an inclined angle of the second axis AX2 of the second roller 2D to the first axis AX1 of the first roller 2A and an inclined angle of the third axis AX3 of the third roller 2E to the first axis AX1 of the first roller 2A are continuously changed during shaping of a filler, a gap corresponding to a cross-sectional shape of a noodle filler whose cross-sectional shape is not constant can be sequentially formed among the first, second, and third rollers 2A, 2D, and 2E. That is, a shape of a gap formed among the first, second, and third rollers 2A, 2D, and 2E can be changed temporally.

Therefore, the coefficient B of a logarithmic spiral and the length of a curve cut as a part of the logarithmic spiral can be determined according to a shape of a noodle filler after shaping. For example, when a plurality of noodle fillers, which have constant cross-sectional shapes and different sizes, are manufactured by the composite material shaping device 1A, the coefficient B of a logarithmic spiral can be determined so that the sizes of R chamfers of the noodle fillers are covered. Meanwhile, when a noodle filler, whose cross-sectional shape changes with keeping a relationship of similarity, is manufactured by the composite material shaping device 1A, the coefficient B of a logarithmic spiral can be determined so that the changing size of a R chamfer of the noodle filler is covered. This is also similar for the length of a curve cut as a part of a logarithmic spiral.

Furthermore, as described in the first implementation, it is preferable to dispose the first, second, and third rollers 2A, 2D, and 2E so that each of the inclined angles of the second axis AX2 and the third axis AX3 to the first axis AX1 becomes not less than 10 degrees and not more than 40 degrees, from a viewpoint of improving flatness of the undersurface of a noodle filler. Therefore, when flatness of the undersurface of a noodle filler is emphasized, a sectional shape of each edge of the second roller 2D and the third roller 2E, i.e., the coefficient B of a logarithmic spiral, the length of a curve and the like can be determined so that each of the inclined angles of the second axis AX2 and the third axis AX3 to the first axis AX1 is adjusted to be in a range not less than 10 degrees and not more than 40 degrees.

Meanwhile, it is preferable to dispose the first, second, and third rollers 2A, 2D, and 2E so that each of the inclined angles of the second axis AX2 and the third axis AX3 to the first axis AX1 becomes not less than 45 degrees and not more than 60 degrees, from a viewpoint of applying compressive forces uniformly on the three sides of a material. Therefore, when quality inside a noodle filler is emphasized, a sectional shape of each edge of the second roller 2D and the third roller 2E, i.e., the coefficient B of a logarithmic spiral, the length of a curve and the like can be determined so that each of the inclined angles of the second axis AX2 and the third axis AX3 to the first axis AX1 is adjusted to be in a range not less than 45 degrees and not more than 60 degrees.

In order to form sharp ridgelines on each of a plurality of noodle fillers which have constant cross-sectional shapes and different sizes, it is important to intermittently change each of an inclined angle of the second axis AX2 of the second roller 2D to the first axis AX1 of the first roller 2A and an inclined angle of the third axis AX3 of the third roller 2E to the first axis AX1 of the first roller 2A, with making the first roller 2A, the second roller 2D, and the third roller 2E contact with each other.

Meanwhile, in order to form sharp ridgelines on a noodle filler whose cross-sectional shape changes, it is important to continuously change each of an inclined angle of the second axis AX2 of the second roller 2D to the first axis AX1 of the first roller 2A and an inclined angle of the third axis AX3 of the third roller 2E to the first axis AX1 of the first roller 2A, with making the first roller 2A, the second roller 2D, and the third roller 2E contact with each other, as described above.

In order to manufacture a noodle filler whose cross-sectional shape changes with keeping line symmetry property, it is important to change each of an inclined angle of the second axis AX2 of the second roller 2D to the first axis AX1 of the first roller 2A and an inclined angle of the third axis AX3 of the third roller 2E to the first axis AX1 of the first roller 2A so that plane symmetry property of the second roller 2D and the third roller 2E is kept.

Therefore, the angle adjusting structures 10 are configured to be able to move not only an inclined angle of the second axis AX2 of the second roller 2D and an inclined angle of the third axis AX3 of the third roller 2E, but also a position of the second axis AX2 of the second roller 2D and a position of the third axis AX3 of the third roller 2E. That is, the angle adjusting structures 10 are configured to be able to perform rotational transfer and parallel translation of the second axis AX2 of the second roller 2D and the third axis AX3 of the third roller 2E.

As a specific example, each of the angle adjusting structures 10 can be composed of a link mechanism 11 including some links 11A which extend and contract as illustrated. In the example shown in the figures, the five links 11A are rotatably connected by four joints 11B. More specifically, the joints 11B, as two fixed ends, are fixed to the link 11A which does not move and functions as the fixed base 12. Each one end of two extendable and contractible linear actuators 13 as the links 11A is rotatably coupled to one of the two joints 11B, which are the fixed ends. Furthermore, one end of another extendable and contractible linear actuator 13 as the link 11A is rotatably coupled to the other of the two joints 11B, which are the fixed ends.

Meanwhile, two joints 11B are fixed to a movable base 14 integrated with each of a bearing of the second shaft of the second roller 2D rotating around the second axis AX2 and a bearing of the third shaft of the third roller 2E rotating around the third axis AX3. Then, one joint 11B fixed to the fixed base 12 and one joint 11B fixed to the movable base 14 are coupled to each other by the first linear actuator 13. Similarly, the other joint 11B fixed to the fixed base 12 and the other joint 11B fixed to the movable base 14 are also coupled to each other by the second linear actuator 13. Furthermore, the other linear actuator 13 is disposed at a position of a diagonal. That is, the three links 11A, which couple between the fixed base 12 and the movable base 14, out of the five links 11A are the extendable and contractible linear actuators 13.

When the link mechanism 11 including such the linear actuators 13 is used, the movable base 14 which bears the second shaft of the second roller 2D rotating around the second axis AX2 can be inclined and moved in parallel, simultaneously. Similarly, the movable base 14 which bears the third shaft of the third roller 2E rotating around the third axis AX3 can also be inclined and moved in parallel, simultaneously. That is, each of an inclined angle of the second axis AX2 of the second roller 2D to the first axis AX1 of the first roller 2A and an inclined angle of the third axis AX3 of the third roller 2E to the first axis AX1 of the first roller 2A can be continuously changed with making the first roller 2A, the second roller 2D, and the third roller 2E contact with each other.

In the case of manufacturing a noodle filler whose cross-sectional shape is not constant, the angle adjusting structures 10 are to move the second axis AX2 of the second roller 2D and the third axis AX3 of the third roller 2E rotationally and in parallel during shaping of the noodle filler. In this case, speeds of the rotation movement and the parallel translation of the second axis AX2 of the second roller 2D and the third axis AX3 of the third roller 2E are determined by a feed speed of a laminated body of prepregs, which is fed as a material, and a change rate of a cross-sectional shape of a noodle filler.

Thus, a controlling device 15 configured by electronic circuitry, such as a computer, can automatically control an operation of the angle adjusting structures 10 and a feed speed of a material. The feed speed of a material, for example, can be automatically controlled by the controlling device 15 as a rotation speed of the first roller 2A. In the case of controlling a rotation speed of the first roller 2A, the number of rotations of a motor for rotating the rotating shaft of the first roller 2A can be adjusted with control signals from the controlling device 15. Alternatively, gears may be disposed, and the gears may be enabled to be changed with control signals from the controlling device 15. Note that, the feed speed of a material may be set as a fixed value so that the feed speed cannot be variably set.

The operation of the angle adjusting structures 10 can be controlled based on a speed of feeding out a laminated body of prepregs, supplied as a material, in the length direction and design information showing a three dimensional shape of the laminated body after shaping. That is, an inclined angle and a position of the second axis AX2 of the second roller 2D, and an inclined angle and a position of the third axis AX3 of the third roller 2E can be automatically controlled with control signals from the controlling device 15, based on the speed of feeding out a laminated body of prepregs and the design information showing a three dimensional shape of the laminated body after shaping.

Therefore, the controlling device 15 is configured to control an inclined angle and a position of the second axis AX2 of the second roller 2D, and an inclined angle and a position of the third axis AX3 of the third roller 2E, in conjunction with a feed speed of a laminated body of prepregs, based on an ideal three dimensional model of a noodle filler so that the laminated body becomes a designed three dimensional shape after shaping.

The controlling device 15 controls an inclined angle and a position of the second axis AX2 of the second roller 2D, and an inclined angle and a position of the third axis AX3 of the third roller 2E so that the first roller 2A, the second roller 2D, and the third roller 2E contact with each other.

Figure 11:
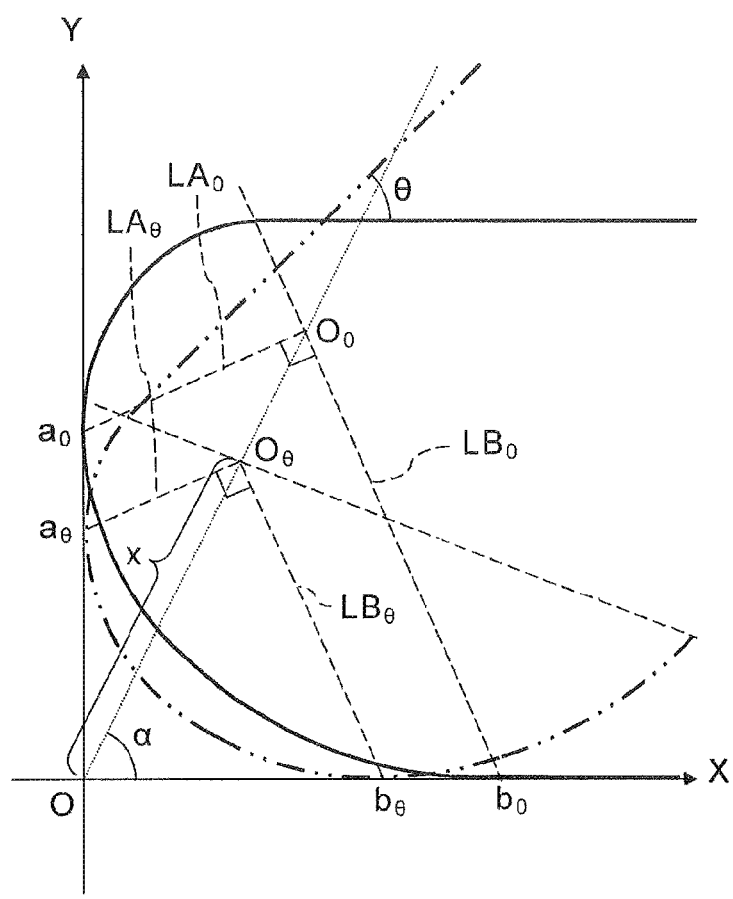
FIG. 11 explains an example of a method of controlling the second roller and the third roller shown in FIG. 8.

FIG. 11 explains an example of a method of controlling the second roller 2D and the third roller 2E shown in FIG. 8.

As shown in FIG. 11, the X-axis can be defined to pass through two tangent points where the second roller 2D and the third roller 2E are tangent to the surface of the first roller 2A. Meanwhile, the Y-axis can also be defined to be perpendicular to the X-axis and pass through a tangent point between the second roller 2D and the third roller 2E.

Then, what is necessary is to control an inclined angle and a position of the second axis AX2 of the second roller 2D, and an inclined angle and a position of the third axis AX3 of the third roller 2E so that each of curves formed in cross sections of edges of the second roller 2D and the third roller 2E is tangent to both of the X-axis and the Y-axis. That is, what is necessary is to control an inclined angle and a position of the second axis AX2 of the second roller 2D, and an inclined angle and a position of the third axis AX3 of the third roller 2E so that each of the tip of the second roller 2D and the tip of the third roller 2E is constantly tangent to a horizontal plane including the X-axis and a vertical plane including the Y-axis.

Therefore, each control value of an inclined angle and a position of the second axis AX2 of the second roller 2D, and each control value of an inclined angle and a position of the third axis AX3 of the third roller 2E can be obtained geometrically.

In particular, when a curve formed in a cross section of each edge of the second roller 2D and the third roller 2E is a part of a logarithmic spiral, what is necessary is to rotationally move the logarithmic spiral, which forms each of the tips of the second roller 2D and the third roller 2E, in the XY-coordinate system shown in FIG. 11 so that the logarithmic spiral constantly touches both of the X-axis and the Y-axis.

As shown in FIG. 11, the center of a logarithmic spiral which forms an edge of the second roller 2D whose inclined angle and position have been determined so that the rotating axis of the second roller 2D becomes parallel to the Y-axis, which is the vertical direction, is expressed by $O_0$, the tangent point between the logarithmic spiral and the Y-axis is expressed by $a_0$, and the tangent point between the logarithmic spiral and the X-axis is expressed by $b_0$. Then, an angle formed between the line segment $LA_0$ connecting the center $O_0$ of the logarithmic spiral with the tangent point $a_0$ on the Y-axis and the line segment $LB_0$ connecting the center $O_0$ of the logarithmic spiral with the tangent point $b_0$ on the X-axis becomes 90 degrees. Similarly, the center of a logarithmic spiral which forms the edge of the second roller 2D whose inclined angle and position have been determined so that the rotating axis of the second roller 2D inclines by an angle θ from the vertical direction is expressed by $O_θ$, the tangent point between the logarithmic spiral and the Y-axis is expressed by $a_θ$, and the tangent point between the logarithmic spiral and the X-axis is expressed by $b_θ$. Then, an angle formed between the line segment $LA_θ$ connecting the center $O_θ$ of the logarithmic spiral with the tangent point $a_θ$ on the Y-axis and the line segment $LB_θ$ connecting the center $O_θ$ of the logarithmic spiral with the tangent point $b_θ$ on the X-axis becomes 90 degrees.

At this time, the quadrangle formed by the line segment $LA_0$, the line segment $LB_0$, the X-axis, and the Y-axis, and the quadrangle formed by the line segment $LA_θ$, the line segment $LB_θ$, the X-axis, and the Y-axis have a relationship of similarity, according to characteristics of a logarithmic spiral. Therefore, what is necessary is to control an inclined angle and a position of the second axis AX2 of the second roller 2D, and an inclined angle and a position of the third axis AX3 of the third roller 2E so that the center $O_0$ of the logarithmic spiral is on a same straight line which always passes through the origin O of the XY coordinate system.

The gradient α of the straight line along which the center $O_θ$ of the logarithmic spiral passes can be obtained using the positive coefficient B, which is not 1, of the logarithmic spiral as shown in expression (2-2) derived by a calculation shown in expression (2-1).

$$\tan α = LB_θ/LA_θ = B^θ/B^{θ-π/2} = B^{π/2} \tag{2-1}$$

$$α = \tan^{-1}(B^{π/2}) \tag{2-2}$$

An area of the quadrangle, formed by the line segment $LA_θ$ connecting the center $O_θ$ of the logarithmic spiral with the tangent point on the Y-axis, the line segment $LB_θ$ connecting the center $O_θ$ of the logarithmic spiral with the tangent point on the X-axis, the X-axis, and the Y-axis, has an inverse proportion relationship with the inclined angle θ of the rotating axis of the second roller 2D to the vertical direction. Therefore, in order to set a distance between the center $O_θ$ of the logarithmic spiral and the origin O to x, what is necessary is to control the inclined angle θ of the rotating axis of the second roller 2D so that the square $x^2$ of the distance x has an inverse proportion relationship with the inclined angle θ.

When the controlling device 15 controls the angle adjusting structures 10 as described above, inclined angles and positions of the rotating axes of the second roller 2D and the third roller 2E can be continuously changed so that a cross-sectional shape of a space among the first roller 2A, the second roller 2D, and the third roller 2E continuously changes. In particular, when a curve formed in a cross section of each edge of the second roller 2D and the third roller 2E is a part of a logarithmic spiral, a cross-sectional shape of a space among the first roller 2A, the second roller 2D, and the third roller 2E can be continuously changed into similar figures.

Then, a laminated body of prepregs whose cross-sectional shape changes continuously can be manufactured by applying pressures on a simple bar-shaped laminated body of prepregs from three directions with the first roller 2A, the second roller 2D, and the third roller 2E. In particular, when a curve formed in a cross section of each edge of the second roller 2D and the third roller 2E is a part of a logarithmic spiral, a laminated body of prepregs whose cross-sectional shape continuously changes into similar figures can be manufactured.

As described above, in the composite material shaping device 1A in the second implementation, the second roller 2D and the third roller 2E whose sectional shape of each edge for applying a pressure on a material is a curve, such as a logarithmic spiral, whose curvature is not constant are disposed oppositely to each other so that a noodle filler can be shaped by a space formed among the second roller 2D, the third roller 2E, and the first roller 2A for forming a flat face. In addition, the composite material shaping device 1A in the second implementation has the angle adjusting structures 10 so that an angle of each rotating axis of the second roller 2D and the third roller 2E can be changed during shaping, or before and after the shaping.

(Effects)

Thereby, the composite material shaping device 1A in the second implementation allows manufacturing a plurality of fillers having different cross-sectional shapes. Furthermore, a filler whose cross-sectional shape is not constant can also be manufactured. In particular, when a sectional shape of each edge of the second roller 2D and the third roller 2E is a logarithmic spiral, a plurality of fillers having a relationship of similarity can be manufactured. Furthermore, a filler whose cross-sectional shape changes with keeping similarity can also be manufactured. Specifically, a filler whose cross-sectional shapes in the length direction differ from each other and whose cross-sectional shapes at different positions in the length direction have a relationship of similarity can be manufactured.

As a result, a filler whose cross-sectional shape changes can be shaped without using a mold, dies or rollers as in the past. In particular, a filler whose cross-sectional shape changes continuously, which was not able to be manufactured even when multistage dies or rollers were used, can be manufactured in a single process.

(Third Implementation)

Figure 12:
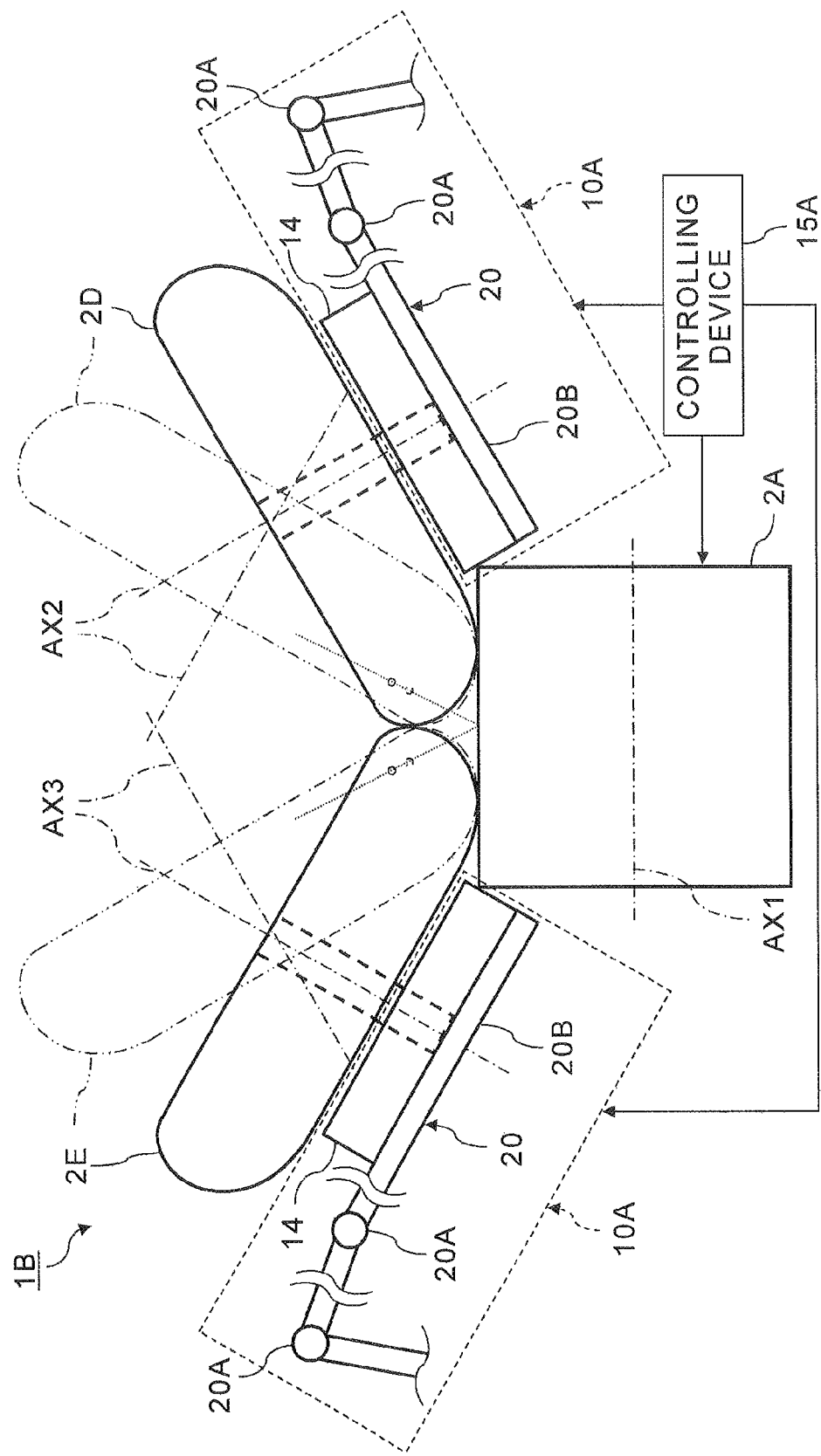
FIG. 12 is a front view of a composite material shaping device according to the third implementation of the present invention.
Figure 13:
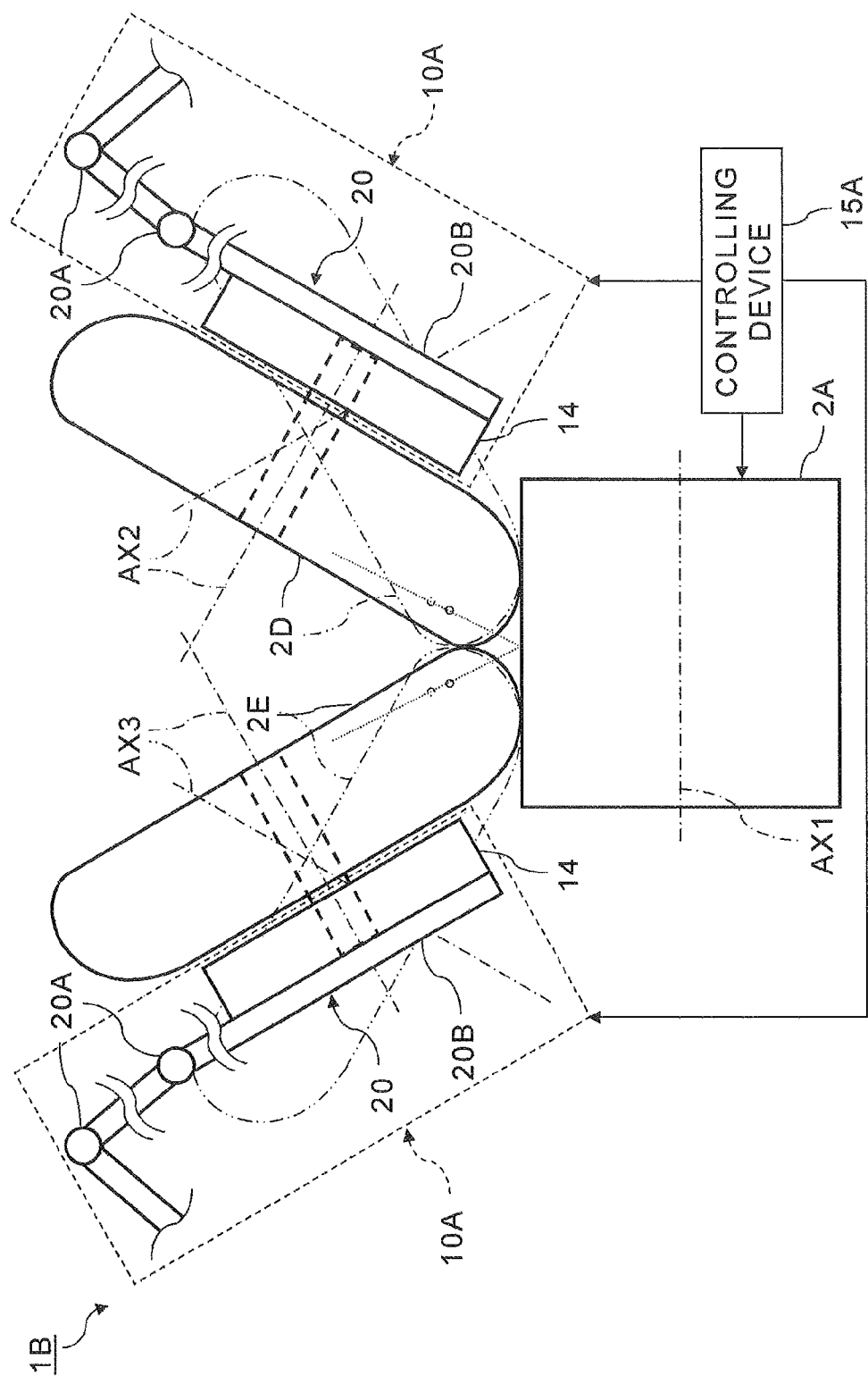
FIG. 13 shows a state where directions of rollers of the composite material shaping device shown in FIG. 12 have been changed.

FIG. 12 is a front view of a composite material shaping device according to the third implementation of the present invention. FIG. 13 shows a state where directions of rollers of the composite material shaping device shown in FIG. 12 have been changed.

A composite material shaping device 1B in the third implementation shown in FIG. 12 is different from the composite material shaping device 1A in the second implementation in a point that each structure of angle adjusting structures 10A is different from that of the angle adjusting structures 10 in the second implementation. Other structures and functions of the composite material shaping device 1B in the third implementation are not substantially different from those of the composite material shaping device 1A in the second implementation. Therefore, only main elements are shown, and the same elements or corresponding elements are shown by the same signs with their explanations omitted.

Each of the angle adjusting structures 10A of the composite material shaping device 1B in the third implementation is composed of a robot arm 20 having plural joints. As described in the second implementation, it is necessary to perform a combination of both of rotation movements and parallel translations of rotating axes of the second roller 2D and the third roller 2E in order to change a direction of each rotating axis of the second roller 2D and the third roller 2E, with making the first roller 2A, the second roller 2D, and the third roller 2E contact with each other.

Thus, one movable base 14 integrated with the bearing of the second shaft of the second roller 2D rotating around the second axis AX2 can be fixed to the tip of one robot arm 20. Similarly, the other movable base 14 integrated with the bearing of the third shaft of the third roller 2E rotating around the third axis AX3 can be fixed to the tip of the other robot arm 20. Then, the respective robot arms 20 can be configured so that the respective rotating axes of the second roller 2D and the third roller 2E can be moved rotationally and in parallel on a same plane.

In that case, each robot arm 20 is to have at least two rotary joints 20A of which directions of rotating axes are parallel to each other. The rotating axis of each rotary joint 20A is parallel to the rotating axis for rotationally moving each rotating axis of the second roller 2D and the third roller 2E. That is, each robot arm 20 is at least two dimensional arm of which end arm 20B can be moved rotationally and in parallel on the same plane.

Each robot arm 20 is controlled by a controlling device 15A configured using circuitry or the like. A method of controlling the respective robot arms 20 by the controlling device 15A only differs in axes to be controlled, from that of controlling the angle adjusting structures 10 by the controlling device 15 in the second implementation and is substantially similar to that of controlling the angle adjusting structures 10 by the controlling device 15 in the second implementation.

The composite material shaping device 1B in the third implementation as described above allows changing inclined angles to the horizontal direction and positions of the second axis AX2 of the second roller 2D and the third axis AX3 of the third roller 2E by the robot arms 20.

Accordingly, the composite material shaping device 1B in the third implementation can achieve effects similar to those in the second implementation. In addition, the angle adjusting structure 10A can be composed of the robot arm 20 which can be easily composed by assembling parts with high versatility, without manufacturing the angle adjusting structure 10 which has a special and complicated structure as described in the second implementation.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, features in the respective implementations may be combined with each other. As a specific example, inclined angles of the second roller 2B and the third roller 2C whose shapes in longitudinal sections at portions contacting with a material are circular arcs as exemplified in the first implementation may be enabled to be changed using the angle adjusting structures 10, 10A exemplified in the second implementation or the third implementation. In that case, the inclined angles of the second roller 2B and the third roller 2C can be changed for every target of shaping. Thus, for example, when improving flatness of the undersurface of a filler is emphasized, the first, second, and third rollers 2A, 2B, and 2C can be disposed so that each of an inclined angle of the second axis AX2 of the second roller 2B to the first axis AX1 of the first roller 2A, and an inclined angle of the third axis AX3 of the third roller 2C to the first axis AX1 of the first roller 2A becomes not less than 10 degrees and not more than 40 degrees. Meanwhile, when applying compressive forces uniformly on three sides of a material is emphasized, the first, second, and third rollers 2A, 2B, and 2C can be disposed so that each of the inclined angle of the second axis AX2 of the second roller 2B to the first axis AX1 of the first roller 2A, and the inclined angle of the third axis AX3 of the third roller 2C to the first axis AX1 of the first roller 2A becomes not less than 45 degrees and not more than 60 degrees.

Shapes and/or directions of the rollers in each implementation may be changed according to a shape of a laminated body of prepregs after shaping.

Figure 14:
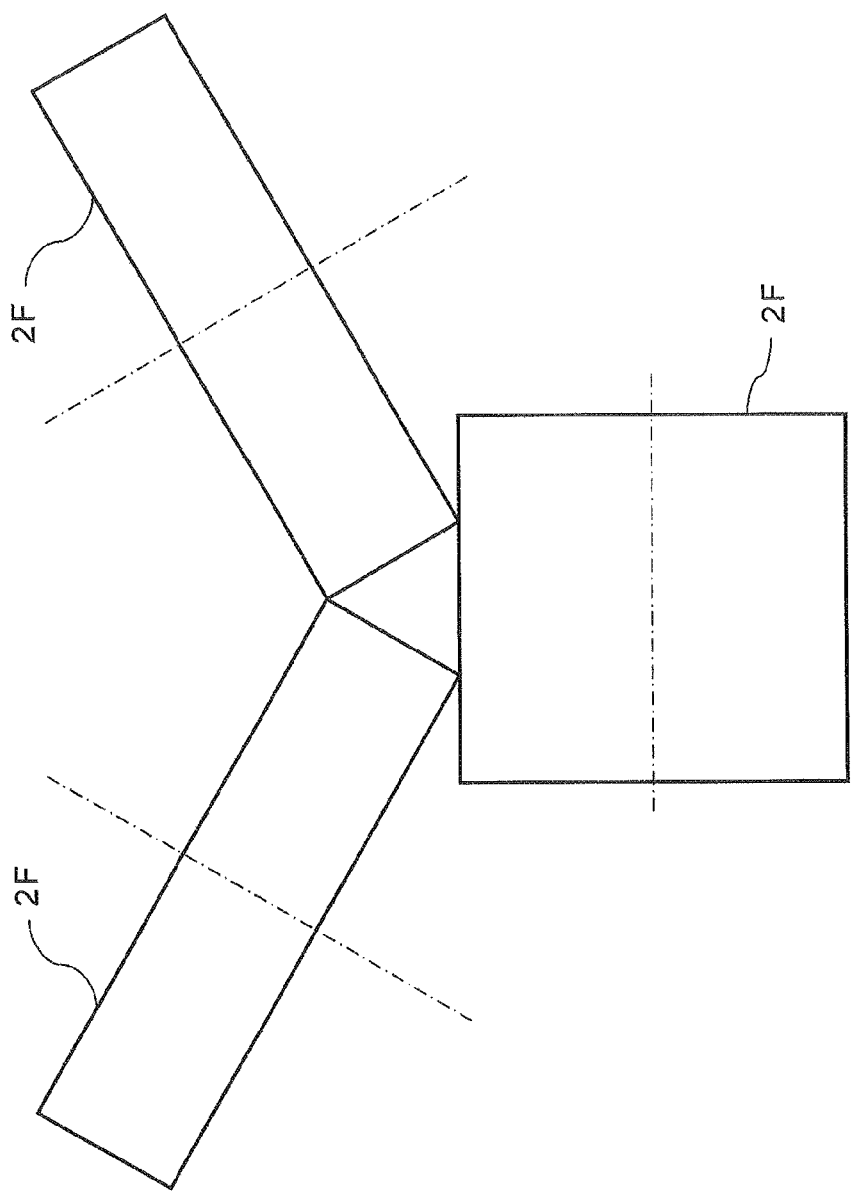
FIG. 14 shows the first modification of the three rollers.

FIG. 14 shows the first modification of the three rollers.

In the case of shaping a filler whose cross-sectional shape is a triangle, three cylindrical rollers 2F can be disposed so that directions of the rotating axes become different from each other on a same plane, as shown in FIG. 14. Specifically, the three rollers 2F whose shapes in longitudinal sections at portions contacting with a material are linear shapes can be disposed in directions different from each other so that each rotating axis lies on the same plane. Then, pressures can be applied on the material by the respective curved surfaces of the three cylindrical rollers 2F.

Figure 15:
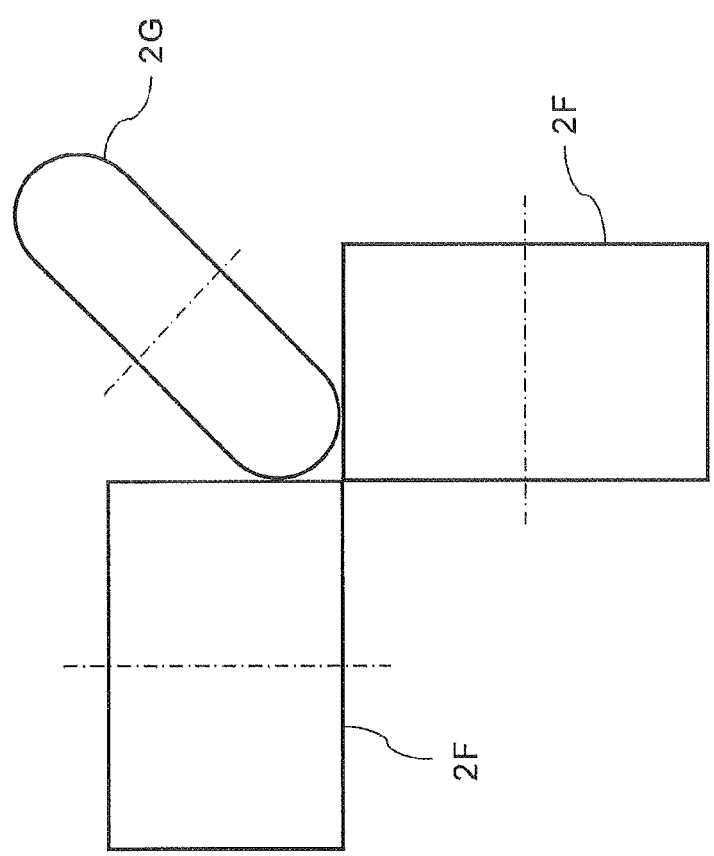
FIG. 15 shows the second modification of the three rollers.

FIG. 15 shows the second modification of the three rollers.

In the case of shaping a filler whose cross-sectional shape is formed by two line segments and one circular arc, two cylindrical rollers 2F and one disk-shaped roller 2G whose edge in a longitudinal section has a curved shape can be disposed so that directions of the rotating axes become different from each other on a same plane, as shown in FIG. 15. Then, pressures can be applied on a material by the respective curved surfaces of the two cylindrical rollers 2F and the one disk-shaped roller 2G.

Not only limited to the examples shown in FIG. 14 and FIG. 15, but also three cylindrical or disk-shaped rollers may be disposed according to a shape of a laminated body of prepregs after shaping. For example, in the case of shaping a filler which has R chamfers of different radii, what is necessary is to dispose two or three disk-shaped rollers having different curved surface shapes according to the radii of the R chamfers.

Regardless of shapes of rollers, a composite material shaping device can also include an angle adjusting structure, which can continuously change an angle of the rotating axis of at least one roller out of three rollers, such as the link mechanism 11 in which some links 11A extend and contract, or the robot arm 20, as exemplified in the second implementation or the third implementation.

In the case of installing an angle adjusting structure, a shape of at least one roller at a portion applying a pressure on a laminated body, in a longitudinal section including the rotating axis, can be a curved line whose curvature is not constant. Thereby, the roller can sequentially apply pressures on the laminated body by a curved surface having different curvatures, by changing an angle of the rotating axis of the roller by the angle adjusting structure. In particular, when the curved line whose curvature is not constant is a part of a logarithmic spiral, the roller can sequentially apply pressures on the laminated body by the curved surface whose different partial shapes in the longitudinal section are curved lines having a relationship of similarity.

For example, a laminated body of prepregs whose cross-sectional shape is not constant can be produced by applying pressures on a laminated body of prepregs laminated in a bar shape, from directions different from each other using three rollers, and continuously changing an angle of the rotating axis of at least one roller out of the three rollers.

As a matter of course, a shape of a portion, applying a pressure on a laminated body, of a roller in a longitudinal section including the rotating axis may be a part of an ellipse, a part of a hyperbola, a part of an exponential function, a part of a logarithmic function, a part of a trigonometric function, or a part of a high order function, such as a parabola so that a filler whose cross-sectional shape changes in the length direction or fillers having a variety of cross-sectional shapes can also be shaped.

What is claimed is:

1. A composite material shaping device comprising:
   three rollers that apply pressures on a laminated body of prepregs, from different directions, the prepregs being laminated in a bar shape; and
   an angle adjusting structure that continuously changes an angle of a rotating axis of at least one roller out of the three rollers, the angle adjusting structure comprising:
      a movable base, the at least one roller being formed on the movable base;
      a plurality of links which are adjusted by extending and contracting to adjust the angle of the rotating axis of the at least one roller; and
      a first joint and a second joint rotatably coupling the plurality of links to the movable base,
   wherein the angle adjusting structure includes a link mechanism including the plurality of links which extend and contract,
   wherein the first joint is connected on a distal end of the movable base and the second joint is connect on an opposite end to the distal end of the moveable base relative to the rotating axis of the at least one roller,
   wherein the plurality of links are connected to and move the first joint and the second joint to adjust the angle of the rotating axis by changing a height of the opposite end of the moveable base with respect to a base of the angle adjusting structure via the link mechanism extending and contracting,
   wherein a shape of a portion of the at least one roller in a longitudinal section including the rotating axis is a part of a logarithmic spiral, the portion applying a pressure on the laminated body, and
   the at least one roller is adapted to sequentially apply pressures on the laminated body by curved surfaces respectively by changing the angle of the rotating axis by the angle adjusting structure, shapes of the curved surface in the longitudinal section being different curved lines having a relationship of similarity.

2. The composite material shaping device according to claim 1,
   wherein a shape of a second portion of the at least one roller in a longitudinal section including the rotating axis is a curved line of which curvature is not constant, the second portion applying a pressure on the laminated body, and
   the at least one roller is adapted to sequentially apply pressures on the laminated body by curved surfaces respectively by changing the angle of the rotating axis by the angle adjusting structure, the curved surfaces having different curvatures respectively.

3. The composite material shaping device according to claim 1,
   wherein the three rollers include:
      a first roller that rotates around a first axis;
      a second roller that rotates around a second axis inclining relative to the first axis; and
      a third roller that rotates around a third axis symmetrical to the second axis with respect to a plane perpendicular to the first axis,
   wherein the first roller, the second roller and the third roller are disposed so as to form a space among the first roller, the second roller and the third roller, the space corresponding to a cross-sectional shape of a noodle filler, the cross-sectional shape of the noodle filler being surrounded by two line-symmetric arcs and a straight line.

4. The composite material shaping device according to claim 3,
   wherein the angle adjusting structure is adapted to change each of an inclined angle of the second axis to the first axis and an inclined angle of the third axis to the first axis, with contacting the second roller with the third roller.

5. The composite material shaping device according to claim 4,
   wherein each of a shape of a portion of the second roller in a longitudinal section including the second axis and a shape of a portion of the third roller in a longitudinal section including the third axis is a curved line of which curvature is not constant, each of the portion of the second roller and the portion of the third roller applying a pressure on the laminated body; and
   the angle adjusting structure is adapted to temporally change a shape of the space formed among the first roller, the second roller and the third roller by changing an inclined angle of the second axis to the first axis and an inclined angle of the third axis to the first axis.

6. The composite material shaping device according to claim 4,
   wherein each of a shape of a portion of the second roller in a longitudinal section including the second axis and a shape of a portion of the third roller in a longitudinal section including the third axis is a part of a logarithmic spiral, each of the portion of the second roller and the portion of the third roller applying a pressure on the laminated body; and
   the angle adjusting structure is adapted to sequentially form spaces among the first roller, the second roller and the third roller by changing an inclined angle of the second axis to the first axis and an inclined angle of the third axis to the first axis, the spaces corresponding to the cross-sectional shape of the noodle filler which is not constant.

7. The composite material shaping device according to claim 4,
   wherein the angle adjusting structure is adapted to automatically control the inclined angle and a position of the second axis, and the inclined angle and a position of the third axis, based on design information showing a three dimensional shape of the laminated body after shaping and a speed of feeding out the laminated body in a length direction.

8. The composite material shaping device according to claim 2,
wherein the three rollers include:
a first roller that rotates around a first axis;
a second roller that rotates around a second axis inclining relative to the first axis; and
a third roller that rotates around a third axis symmetrical to the second axis with respect to a plane perpendicular to the first axis,
wherein the first roller, the second roller and the third roller are disposed so as to form a space among the first roller, the second roller and the third roller, the space corresponding to a cross-sectional shape of a noodle filler, the cross-sectional shape of the noodle filler being surrounded by two line-symmetric arcs and a straight line.

9. The composite material shaping device according to claim 8,
wherein the angle adjusting structure is adapted to change each of an inclined angle of the second axis to the first axis and an inclined angle of the third axis to the first axis, with contacting the second roller with the third roller.

10. The composite material shaping device according to claim 5,
wherein the angle adjusting structure is adapted to automatically control the inclined angle and a position of the second axis, and the inclined angle and a position of the third axis, based on design information showing a three dimensional shape of the laminated body after shaping and a speed of feeding out the laminated body in a length direction.

11. The composite material shaping device according to claim 6,
wherein the angle adjusting structure is adapted to automatically control the inclined angle and a position of the second axis, and the inclined angle and a position of the third axis, based on design information showing a three dimensional shape of the laminated body after shaping and a speed of feeding out the laminated body in a length direction.

12. The composite material shaping device according to claim 2,
wherein the angle adjusting structure includes a robot arm.

13. The composite material shaping device according to claim 1, wherein a link of the plurality of links is contractible and expandable so as to have an adjustable length.

14. The composite material shaping device according to claim 1, wherein a link of the plurality of links comprises a linear actuator which contracts and expands to adjust the angle of the rotating axis of the at least one roller.

15. A composite material shaping device comprising:
a plurality of rollers that apply pressure on a laminated body of prepregs, comprising:
a first roller that rotates around a first axis;
a second roller that rotates around a second axis which is slanted relative to the first axis; and
a third roller that rotates around a third axis symmetrical to the second axis with respect to a plane perpendicular to the first axis;
an angle adjusting device that adjusts an angle of at least one of the second and third axes, the angle adjusting structure comprising:
a movable base, one of the second roller and the third roller being formed on the movable base;
a plurality of links which are adjusted by extending and contracting to adjust the angle of the rotating axis of one of the second roller and the third roller; and
a first joint and a second joint rotatably coupling the plurality of links to the movable base; and
a controller that controls an operation of the angle adjusting device and a feed speed of the laminated body of prepregs,
wherein the first joint is connected on a distal end of the movable base and the second joint is connect on an opposite end to the distal end of the moveable base relative to the rotating axis of the at least one roller,
wherein the plurality of links are connected to and move the first joint and the second joint to adjust the angle of the rotating axis by changing a height of the opposite end of the moveable base with respect to a base of the angle adjusting structure via the controller,
wherein a shape of a portion of the at least one roller in a longitudinal section including the rotating axis is a part of a logarithmic spiral, the portion applying a pressure on the laminated body, and
the at least one roller is adapted to sequentially apply pressures on the laminated body by curved surfaces respectively by changing the angle of the rotating axis by the angle adjusting structure, shapes of the curved surface in the longitudinal section being different curved lines having relationship of similarity.

16. The composite material shaping device according to claim 15, wherein the second and third rollers comprise a curved surface that contacts the laminated body and has a non-constant radius of curvature.

17. A composite material shaping method for shaping the laminated body using the composite material shaping device according to claim 1.

* * * * *